(12) United States Patent
Nakamura

(10) Patent No.: US 10,778,864 B2
(45) Date of Patent: Sep. 15, 2020

(54) IMAGE PROCESSING APPARATUS, PRINTING APPARATUS, CONTROL METHOD, AND STORAGE MEDIUM IN WHICH A TRANSMISSION UNIT TRANSMITS A PLURALITY OF UNITS OF BAND DATA TO FIRST AND SECOND PROCESSING UNITS AT A PARTICULAR TIMING

(71) Applicant: CANON KABUSHIKI KAISHA, Tokyo (JP)

(72) Inventor: Hironori Nakamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/123,114

(22) Filed: Sep. 6, 2018

(65) Prior Publication Data
US 2019/0082073 A1    Mar. 14, 2019

(30) Foreign Application Priority Data
Sep. 11, 2017    (JP) .................... 2017-174172

(51) Int. Cl.
*H04N 1/034*    (2006.01)
*H04N 1/32*    (2006.01)
(Continued)

(52) U.S. Cl.
CPC .......... *H04N 1/034* (2013.01); *B41J 2/04501* (2013.01); *B41J 2/2142* (2013.01);
(Continued)

(58) Field of Classification Search
CPC ..................................................... H04N 1/034
(Continued)

(56) References Cited

U.S. PATENT DOCUMENTS 6,277,529 B1    8/2001  Marumoto et al.
7,874,630 B2    1/2011  Hayashi
(Continued)

FOREIGN PATENT DOCUMENTS

CN        1798656 A     7/2006
CN      101052974 A    10/2007
(Continued)

OTHER PUBLICATIONS

Search Report dated Jan. 16, 2019, issued in corresponding European Patent Application No. 18190651.2.
(Continued)

*Primary Examiner* — Jacky X Zheng
(74) *Attorney, Agent, or Firm* — Venable LLP

(57) ABSTRACT

An image processing apparatus processes data for printing an image by relatively moving a printing unit and a printing medium. The printing unit includes a plurality of printing elements arranged in a first direction, and the relative movement is in a second direction that intersects with the first. The apparatus includes an acquisition unit to acquire image data corresponding to an image of one page, a first processing unit to process first image data corresponding to a first processing area of the image by using a common parameter for each pixel arranged in the second direction, for generating first print data that is used for the printing unit, a second processing unit to process second image data corresponding to a second processing area of the image by using a common parameter for each pixel arranged in the second direction, for generating second print data used for the printing unit.

27 Claims, 14 Drawing Sheets

(51) Int. Cl.
    *B41J 2/045*     (2006.01)
    *B41J 2/21*     (2006.01)
    *G06F 3/12*     (2006.01)

(52) U.S. Cl.
    CPC ............ *G06F 3/1237* (2013.01); *H04N 1/32* (2013.01); *H04N 1/32587* (2013.01); *H04N 1/32593* (2013.01)

(58) Field of Classification Search
    USPC ........................................................ 358/1.15
    See application file for complete search history.

(56) References Cited

U.S. PATENT DOCUMENTS

| | | | |
|---|---|---|---|
| 8,085,428 | B2 | 12/2011 | Gardner |
| 9,030,713 | B2 | 5/2015 | Nakamura |
| 9,533,492 | B2 | 1/2017 | Murasawa et al. |
| 9,815,274 | B2 | 11/2017 | Murasawa et al. |
| 2004/0202383 | A1 | 10/2004 | Larson et al. |
| 2006/0120787 | A1* | 6/2006 | Abello ................. H04N 1/1903 400/76 |
| 2007/0263244 | A1 | 11/2007 | Sugitani et al. |
| 2009/0153892 | A1 | 1/2009 | Torii |
| 2012/0002864 | A1 | 1/2012 | Kouno |
| 2016/0297191 | A1* | 10/2016 | Murasawa ........... B41J 2/04586 |

FOREIGN PATENT DOCUMENTS

| | | |
|---|---|---|
| CN | 101497277 A | 8/2009 |
| CN | 102316345 A | 1/2012 |
| EP | 1 502 430 A1 | 2/2005 |
| JP | 2000-089017 A | 3/2000 |
| JP | 2001-053941 A | 2/2001 |
| JP | 2016-198967 A | 12/2016 |
| WO | 03/094502 A1 | 11/2003 |

OTHER PUBLICATIONS

Office Action dated Jul. 3, 2020, issued in corresponding Chinese Patent Application No. 201811048259.8.

* cited by examiner

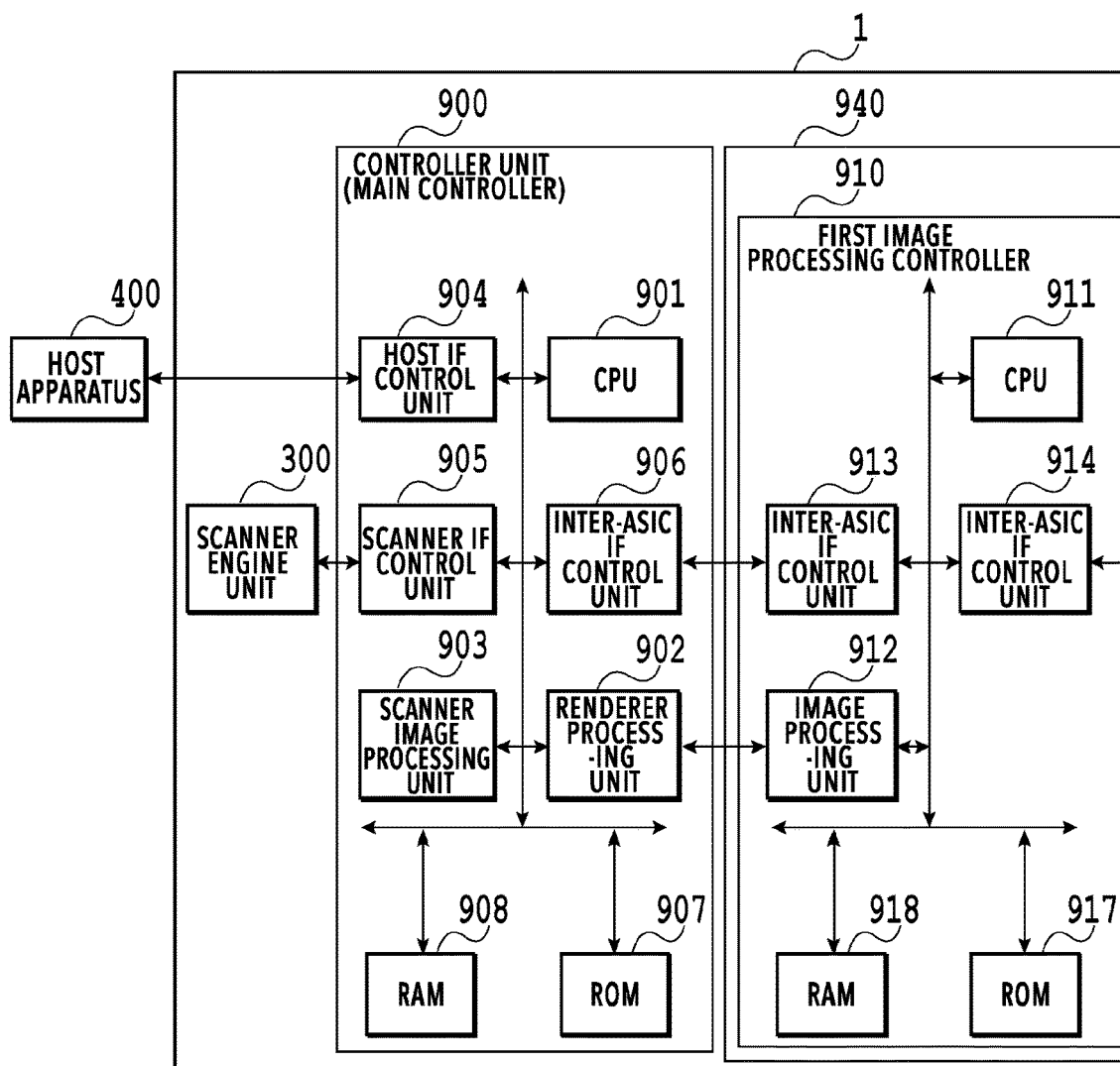

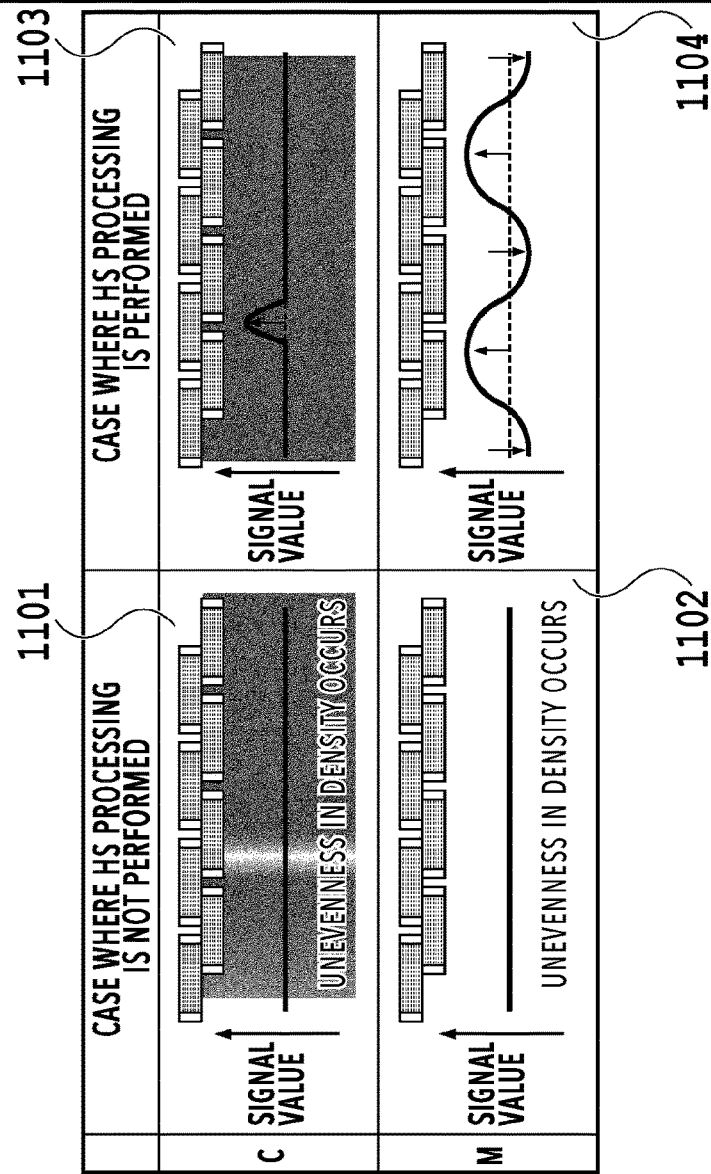
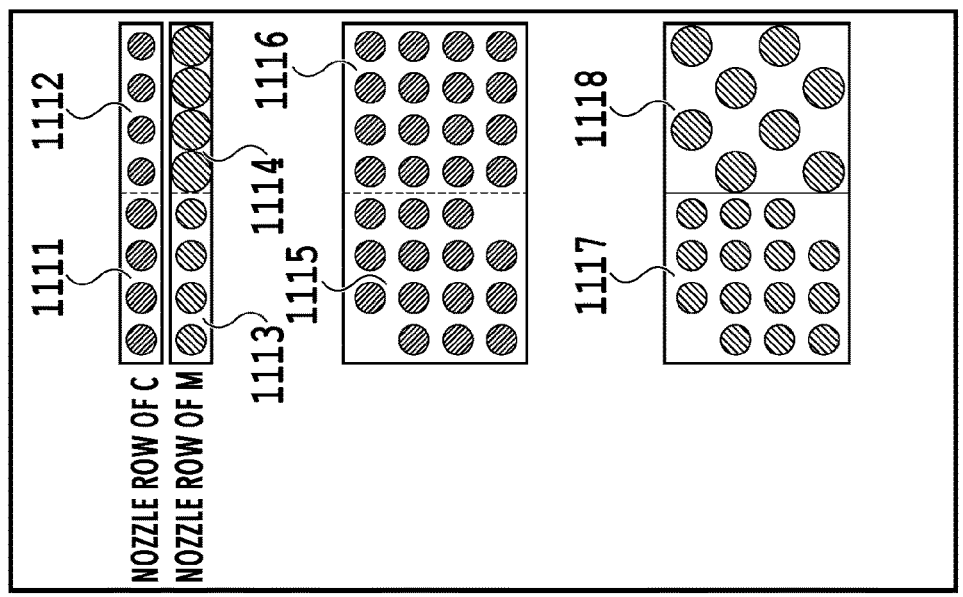
FIG.6A
FIG.6B

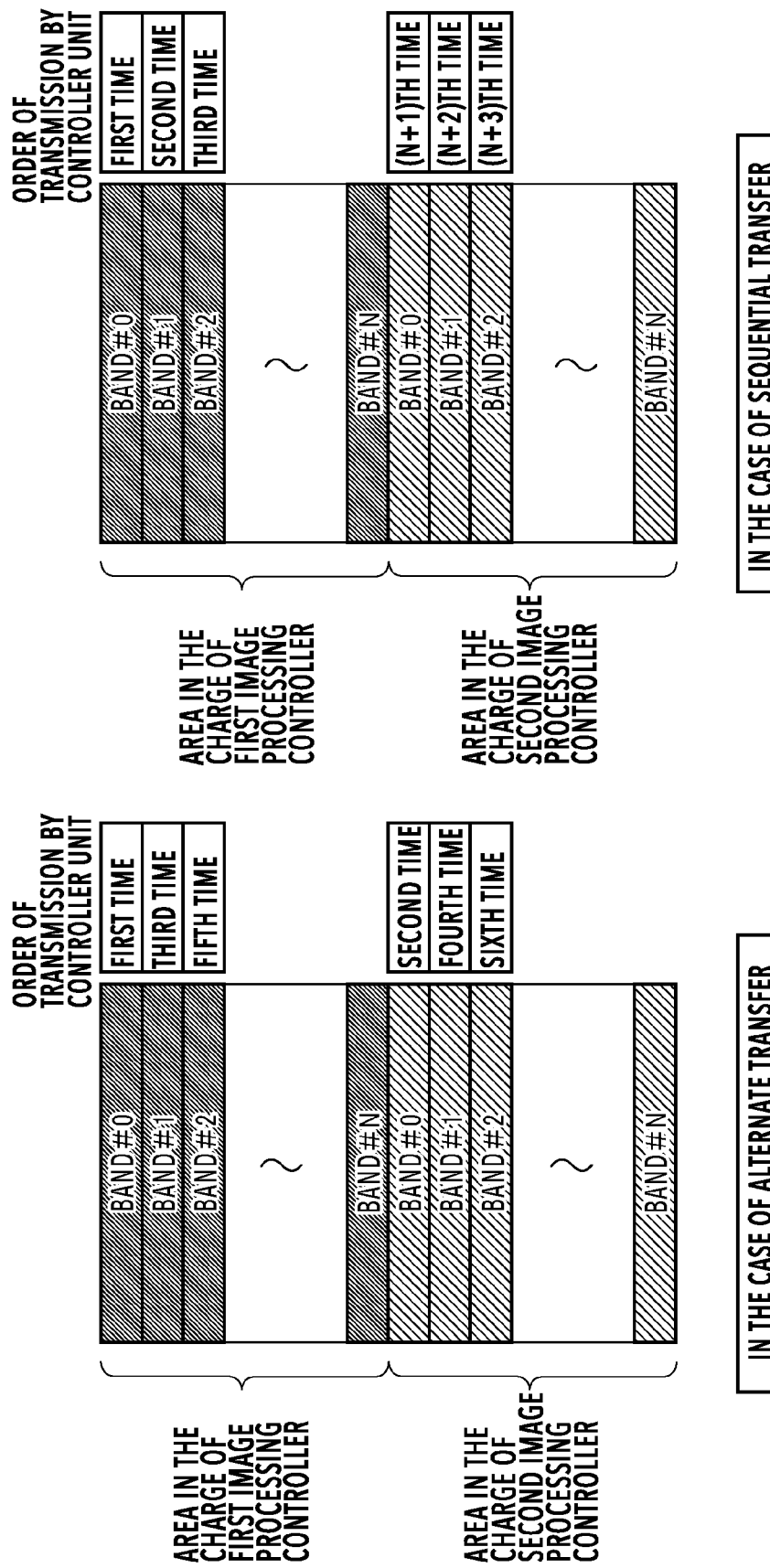

IMAGE PROCESSING APPARATUS, PRINTING APPARATUS, CONTROL METHOD, AND STORAGE MEDIUM IN WHICH A TRANSMISSION UNIT TRANSMITS A PLURALITY OF UNITS OF BAND DATA TO FIRST AND SECOND PROCESSING UNITS AT A PARTICULAR TIMING

BACKGROUND OF THE INVENTION

This application claims the benefit of Japanese Patent Application No. 2017-174172, filed Sep. 11, 2017, which is hereby incorporated by reference herein in its entirety.

Field of the Invention

The present invention relates to an image processing apparatus, a printing apparatus, a control method, and a storage medium.

Description of the Related Art

Japanese Patent Laid-Open No. 2016-198967 has described dividing image data into areas and causing two image processing application specific integrated circuits (ASICSs) to process the image data divided into areas in parallel.

Japanese Patent Laid-Open No. 2016-198967, however, has not disclosed how to transmit the image data divided into areas to the two image processing ASICs. Because of this, there is a concern that it is not possible to implement efficient parallel processing.

SUMMARY OF THE INVENTION

Consequently, in view of the above-described problem, an object of the present invention is to quickly generate print data by causing a plurality of image processing controllers to operate in parallel without idling the controllers.

The present invention is an image processing apparatus that processes data made use of for printing an image by relatively moving a printing unit (including a plurality of ink ejection ports arranged in a first direction) and a printing medium in a second direction that intersects with the first direction, the image processing apparatus including an acquisition unit configured to acquire image data corresponding to one page, a plurality of processing units configured to perform image processing for generating print data that is used for the printing unit to eject ink based on image data by using a common parameter for data of each pixel arranged in the second direction in response to reception of the image data to be processed in accordance with each of a plurality of processing areas whose positions in the first direction within one page are different from one another, and a transmission unit configured to perform repetitive transmission processing that repeats transmission of image data acquired by the acquisition unit in order to each of the plurality of image processing units by taking band data as a unit, which corresponds to a band area whose length in the first direction is shorter than a length in the first direction of the processing area, and which includes processing to transmit image data corresponding to a second band area adjacent to a first band area in each of the plurality of processing areas after transmission of image data corresponding to the first band area in each of the plurality of processing areas is completed.

Further features of the present invention will become apparent from the following description of exemplary embodiments with reference to the attached drawings.

BRIEF DESCRIPTION OF THE DRAWINGS

FIG. 4A-1 and FIG. 4A-2 are control configuration diagrams of a printing apparatus in a first embodiment and FIG. 4B is a control configuration diagram of an image processing controller in the first embodiment;

FIG. 6A and FIG. 6B are explanatory diagrams of head shading processing;

FIG. 10A is a diagram showing a transmission order of image data in the first embodiment and FIG. 10B is a diagram showing a transmission order of image data in a second embodiment;

FIG. 11 is a diagram showing the relationship between FIG. 11A and FIG. 11B.

DESCRIPTION OF THE EMBODIMENTS

Figure 1:
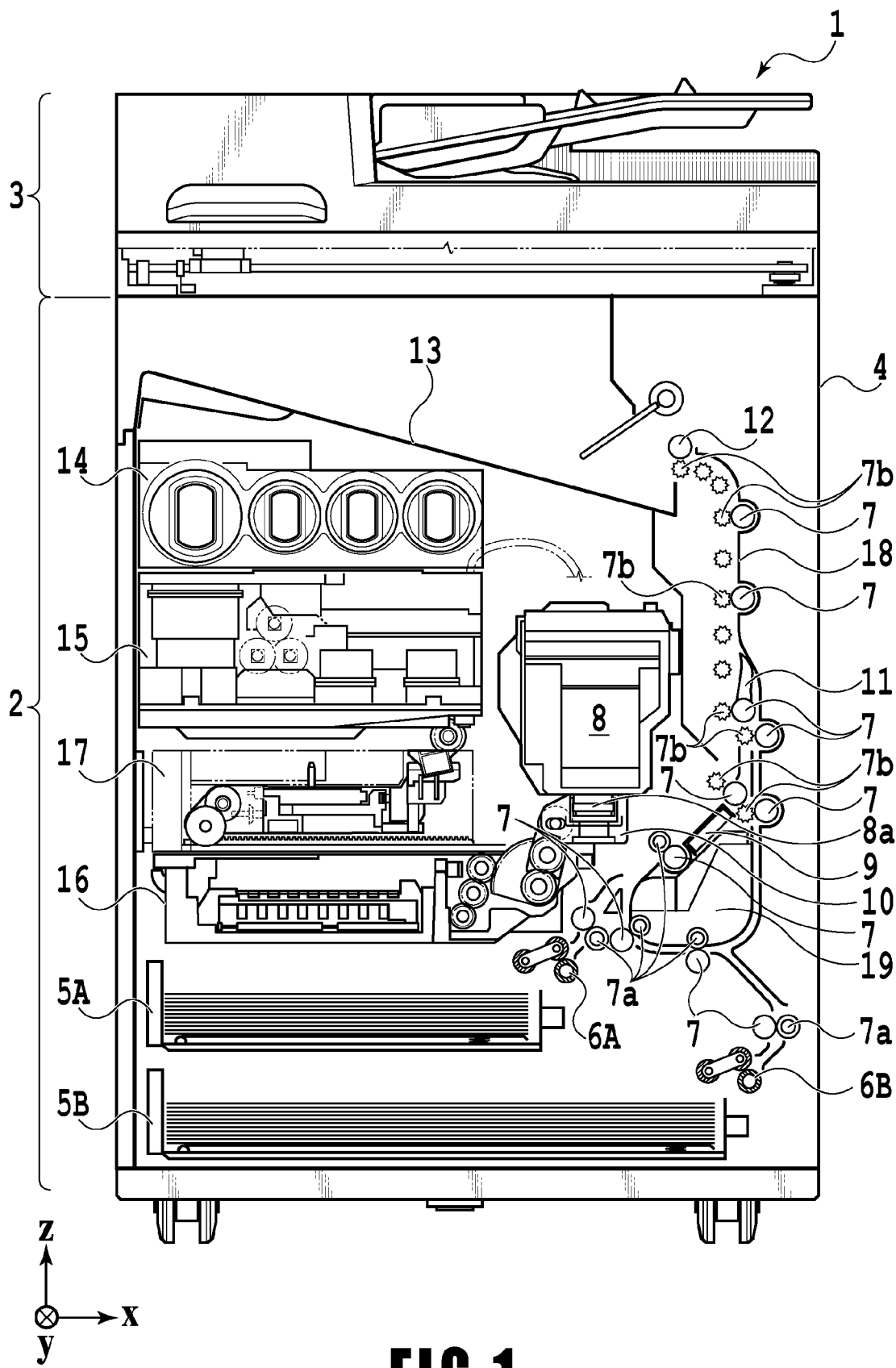
FIG. 1 is a diagram in a case when a printing apparatus is in a standby state.

FIG. 1 is an internal configuration diagram of an ink jet printing apparatus 1 (hereafter, printing apparatus 1) used in the present embodiment. In FIG. 1, the x-direction indicates the horizontal direction, the y-direction (direction perpendicular to the paper surface) indicates the direction in which ejection ports are arrayed in a print head 8, to be described later, and the z-direction indicates the vertical direction, respectively.

The printing apparatus 1 is an MFP (Multi Function Peripheral) including a print unit 2 and a scanner unit 3 and capable of performing various kinds of processing relating to the printing operation and the reading operation by the print unit 2 and the scanner unit 3 individually, or by an interlocking manner of the print unit 2 and the scanner unit 3. The scanner unit 3 includes an ADF (Auto Document Feeder) and an FBS (Flat Bed Scanner) and is capable of reading of a document automatically fed by the ADF and reading (scanning) of a document placed on a document table of the FBS by a user. The present embodiment is the MFP having both the print unit 2 and the scanner unit 3, but the MFP may be an aspect in which the scanner unit 3 is not included. FIG. 1 shows a case when the printing apparatus 1 is in a standby state where the printing apparatus 1 is performing neither the printing operation nor the reading operation.

In the print unit 2, at the bottom in the vertically downward direction of a body 4, a first cassette 5A and a second cassette 5B for storing a printing medium (cut sheet) S are installed in an attachable and detachable manner. In the first cassette 5A, comparatively small printing media up to the A4 size, and in the second cassette 5B, comparatively large printing media up to the A3 size are stored in a piled-up manner. In the vicinity of the first cassette 5A, a first feed unit 6A for feeding stored printing media by separating one by one is provided. Similarly, in the vicinity of the second cassette 5B, a second feed unit 6B is provided. In a case when the printing operation is performed, the printing medium S is selectively fed from one of the cassettes.

A conveyance roller 7, a discharge roller 12, a pinch roller 7a, a spur 7b, a guide 18, an inner guide 19, and a flapper 11 are conveyance mechanisms for guiding the printing medium S in a predetermined direction. The conveyance roller 7 is arranged on the upstream side and on the downstream side of the print head 8 and is a drive roller that is driven by a conveyance motor, not shown schematically. The pinch roller 7a is a follower roller that nips and rotates the printing medium S together with the conveyance roller 7. The discharge roller 12 is arranged on the downstream side of the conveyance roller 7 and is a drive roller that is driven by a conveyance roller, not shown schematically. The spur 7b sandwiches and conveys the printing medium S together with the conveyance roller 7 arranged on the downstream side of the print head 8 and the discharge roller 12.

The guide 18 is provided in the conveyance path of the printing medium S and guides the printing medium S in a predetermined direction. The inner guide 19 is a member extending in the y-direction and has a curved side surface, and guides the printing medium S along the side surface. The flapper 11 is a member for switching directions in which the printing medium S is conveyed at the time of the both-side printing operation. A discharge tray 13 is a tray for loading and holding the printing medium S for which the printing operation has been completed and which is discharged by the discharge roller 12.

The print head 8 of the present embodiment is a color ink jet print head of full line type and in which a plurality of ejection ports from which ink is ejected in accordance with print data is arrayed along the y-direction in FIG. 1 so as to correspond to the width of the printing medium S. In a case when the print head 8 is at the standby position, an ejection port surface 8a of the print head 8 faces in the vertically downward direction and is capped by a cap unit 10 as shown in FIG. 1. In a case when the printing operation is performed, by a print controller 202, to be described later, the direction of the print head 8 is changed so that the ejection port surface 8a faces a platen 9. The platen 9 is made up of a flat plate extending in the y-direction and supports the printing medium S from the rear side, for which the printing operation is performed by the print head 8. The movement of the print head 8 from the standby position to the printing position will be described later in detail.

An ink tank unit 14 stores four color inks to be supplied to the print head 8, respectively. An ink supply unit 15 is provided on the way in the flow path connecting the ink tank unit 14 and the print head 8 and adjusts the pressure and the amount of flow of the ink within the print head 8 to an appropriate range. In the present embodiment, a circulation-type ink supply system is adopted and the ink supply unit 15 adjusts the pressure of the ink supplied to the print head 8 and the amount of flow of the ink recovered from the print head 8 to an appropriate range.

A maintenance unit 16 includes the cap unit 10 and a wiping unit 17 and performs the maintenance operation for the print head 8 by causing these units to operate at predetermined timing. The maintenance operation will be explained later in detail.

Figure 2:
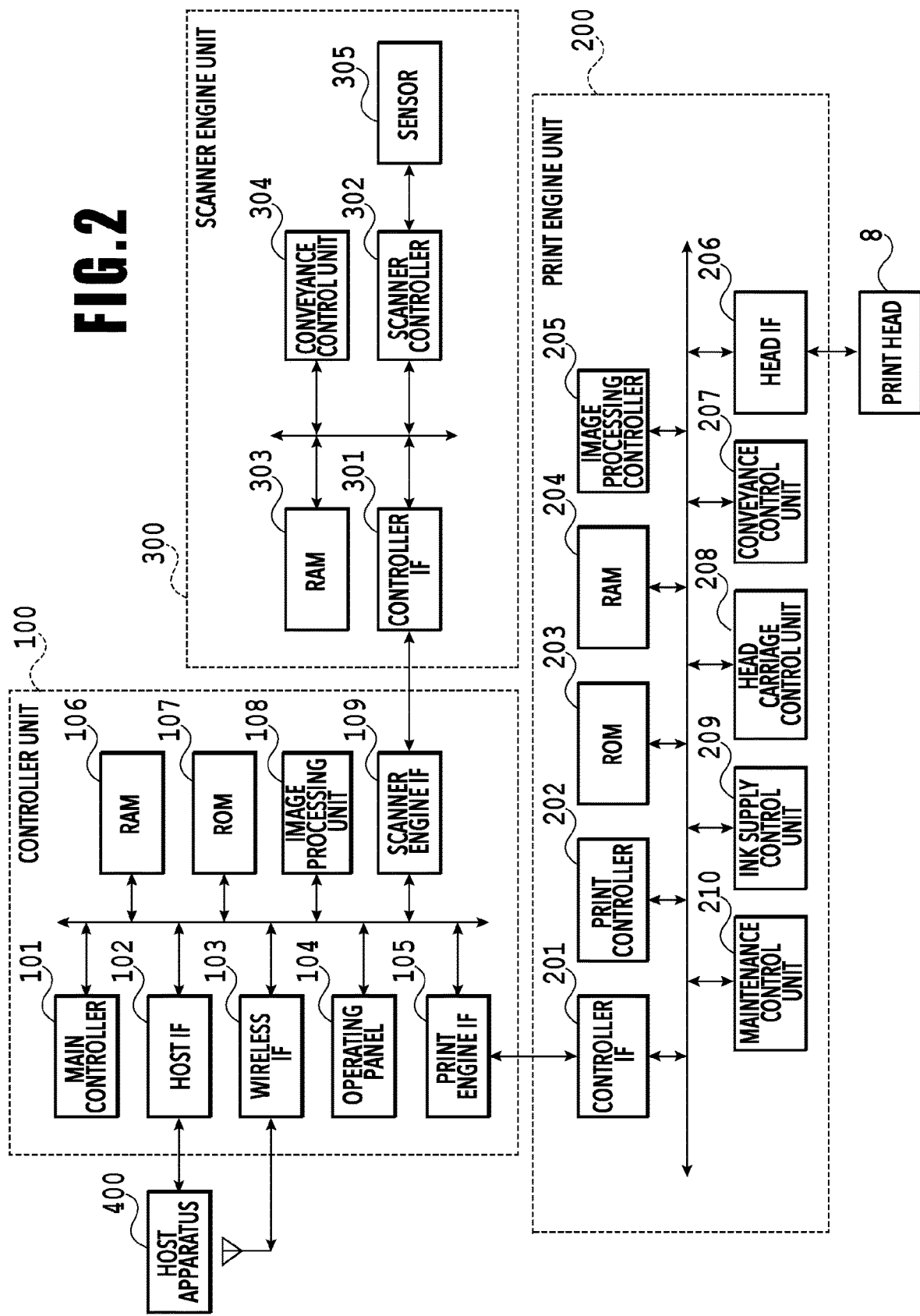
FIG. 2 is a control configuration diagram of the printing apparatus.

FIG. 2 is a block diagram showing a control configuration in the printing apparatus 1. The control configuration includes a print engine unit 200 configured to centralizedly control the print unit 2 mainly, a scanner engine unit 300 configured to centralizedly control the scanner unit 3, and a controller unit 100 configured to centralizedly control the entire printing apparatus 1. The print controller 202 controls various mechanisms of the print engine unit 200 in accordance with instructions of a main controller 101 of the controller unit 100. Various mechanisms of the scanner engine unit 300 are controlled by the main controller 101 of the controller unit 100. In the following, details of the control configuration are explained.

In the controller unit 100, the main controller 101, including a CPU, controls the entire printing apparatus 1 by using a RAM 106 as a work area in accordance with programs and various parameters stored in a ROM 107. For example, in a case when a print job is input from a host apparatus 400 via a host I/F 102 or a wireless I/F 103, predetermined image processing is performed for image data received by an image processing unit 108 in accordance with instructions of the main controller 101. Then, the main controller 101 transmits the image data for which image processing has been performed to the print engine unit 200 via a print engine I/F 105.

The printing apparatus 1 may acquire image data from the host apparatus 400 via wireless communication or wired communication or may acquire image data from an external storage device (a USB memory, and the like) connected to the printing apparatus 1. The communication method that is made use of for wireless communication or wired communication is not limited. For example, as the communication method that is made use of for wireless communication, it is possible to apply Wi-Fi (Wireless Fidelity) (registered trademark) and Bluetooth (registered trademark). Further, as the communication method that is made use of for wired communication, it is possible to apply a USB (Universal Serial Bus), and the like. Furthermore, for example, in a case when a read command is input from the host apparatus 400, the main controller 101 transmits this command to the scanner unit 3 via a scanner engine I/F 109.

An operation panel 104 is a mechanism for a user to input and to output for the printing apparatus 1. It is possible for a user to give instructions as to the operation, such as copy and scan, to set a printing mode, to recognize information on the printing apparatus 1, and so on, via the operation panel 104.

In the print engine unit 200, the print controller 202, including a CPU, controls various mechanisms included in the print unit 2 by using a RAM 204 as a work area in accordance with programs and various parameters stored in a ROM 203. In a case when various commands and image data are received via a controller I/F 201, the print controller 202 temporarily stores them in the RAM 204. The print controller 202 causes an image processing controller 205 to convert the saved image data into print data so that the print head 8 can make use of for the printing operation. In a case when print data is generated, the print controller 202 causes the print head 8 to perform the printing operation based on the print data via a head I/F 206. At this time, the print controller 202 conveys the printing medium S by driving the feed units 6A and 6B, the conveyance roller 7, the discharge roller 12, and the flapper 11 shown in FIG. 1 via a conveyance control unit 207. In accordance with instructions of the print controller 202, the printing operation by the print head 8 is performed by interlocking the conveyance operation of the printing medium S and thus printing processing is performed. Here, the case is shown where the print engine unit 200 includes the one image processing controller (CPU) 205, the one ROM 203, and the one RAM 204. However, the numbers of image processing controllers (CPUs), ROMs, and RAMs included in the print engine unit 200 are not limited to one, respectively, and the numbers may be two or more.

A head carriage control unit 208 changes the direction and position of the print head 8 in accordance with the operating state, such as the maintenance state and the printing state, of the printing apparatus 1. An ink supply control unit 209 controls the ink supply unit 15 so that the pressure of the ink supplied to the print head 8 is adjusted within an appropriate range. A maintenance control unit 210 controls the operation of the cap unit 10 and the wiping unit 17 in the maintenance unit 16 at the time of performing the maintenance operation for the print head 8.

In the scanner engine unit 300, the main controller 101 controls hardware resources of a scanner controller 302 by using the RAM 106 as a work area in accordance with programs and various parameters stored in the ROM 107. Due to this, various mechanisms included in the scanner unit 3 are controlled. For example, by the main controller 101 controlling the hardware resources within the scanner controller 302 via a controller I/F 301, a document mounted on the ADF by a user is conveyed via a conveyance control unit 304 and read by a sensor 305. Then, the scanner controller 302 saves the read image data in a RAM 303. It is possible for the print controller 202 to cause the print head 8 to perform the printing operation based on the image data read by the scanner controller 302 by converting the image data acquired as described above into print data.

Figure 3:
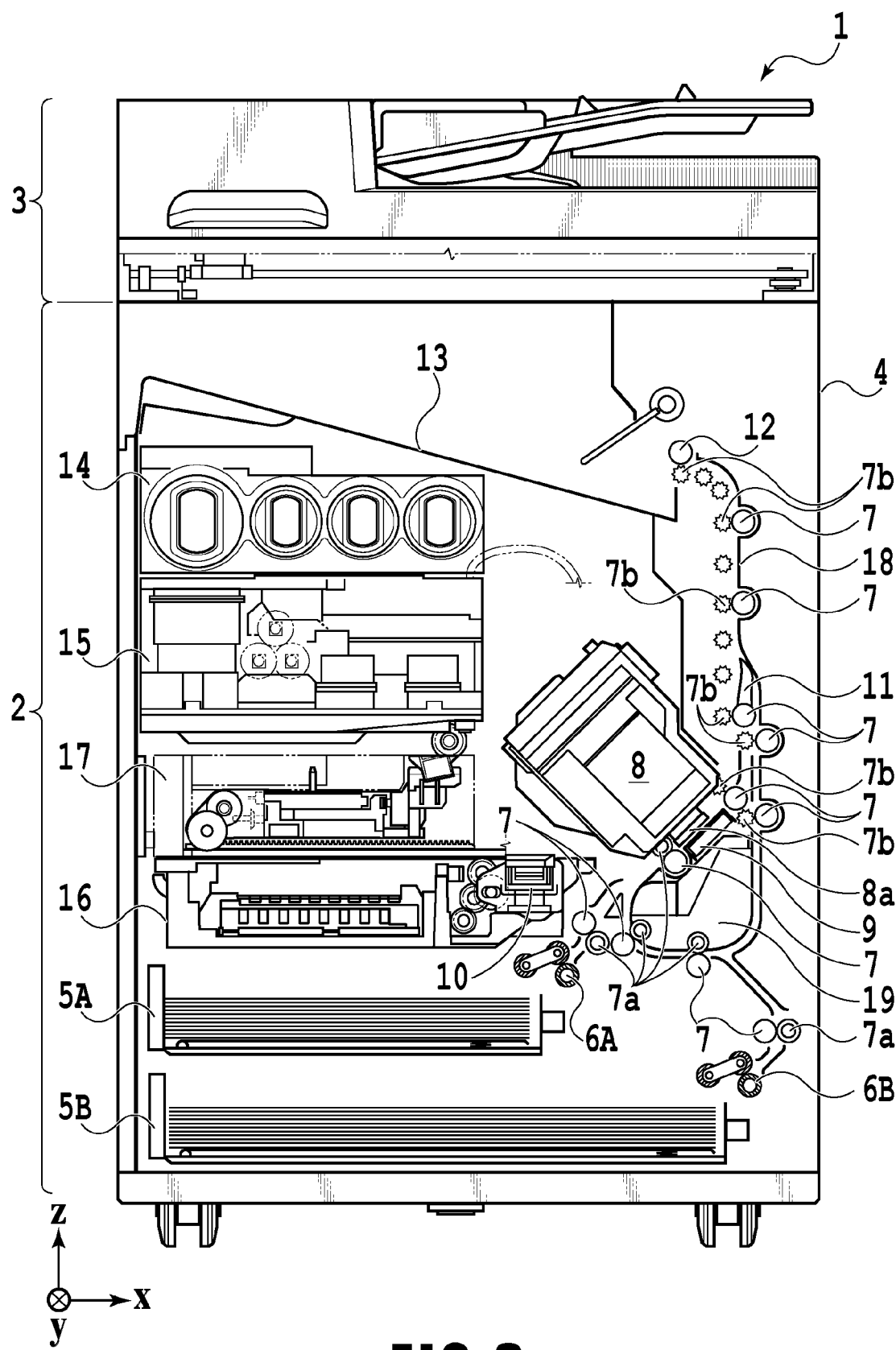
FIG. 3 is a diagram in a case when the printing apparatus is in a printing state.

FIG. 3 shows a case when the printing apparatus 1 is in the printing state. Compared to the standby state shown in FIG. 1, the cap unit 10 separates from the ejection port surface 8a of the print head 8 and the ejection port surface 8a faces the platen 9. In the present embodiment, the plane of the platen 9 is inclined about forty-five degrees with respect to the horizontal direction and the ejection port surface 8a of the print head 8 at the printing position is also inclined about forty-five degrees with respect to the horizontal direction so that the distance from the platen 9 is maintained at a constant value.

At the time of moving the print head 8 from the standby position shown in FIG. 1 to the printing position shown in FIG. 3, the print controller 202 lowers the cap unit 10 down to the evacuate position shown in FIG. 3 by using the maintenance control unit 210. Due to this, the ejection port surface 8a of the print head 8 separates from a cap member 10a. After this, the print controller 202 rotates the print head 8 by forty-five degrees while adjusting the height in the vertical direction of the print head 8 by using the head carriage control unit 208 and causes the ejection port surface 8a to face the platen 9. In a case when the printing operation is completed and the print head 8 moves from the printing position to the standby position, the process opposite to that described above is performed by the print controller 202.

Next, the conveyance path of the printing medium S in the print unit 2 is explained. In a case when a print command is input, first, the print controller 202 moves the print head 8 to the printing position shown in FIG. 3 by using the maintenance control unit 210 and the head carriage control unit 208. After this, the print controller 202 drives one of the first feed unit 6A and the second feed unit 6B in accordance with the print command by using the conveyance control unit 207 and feeds the printing medium S.

In the following, with the basic configuration explained so far in mind, preferred embodiments of the present invention are explained.

First Embodiment

Figures 2, 4A:
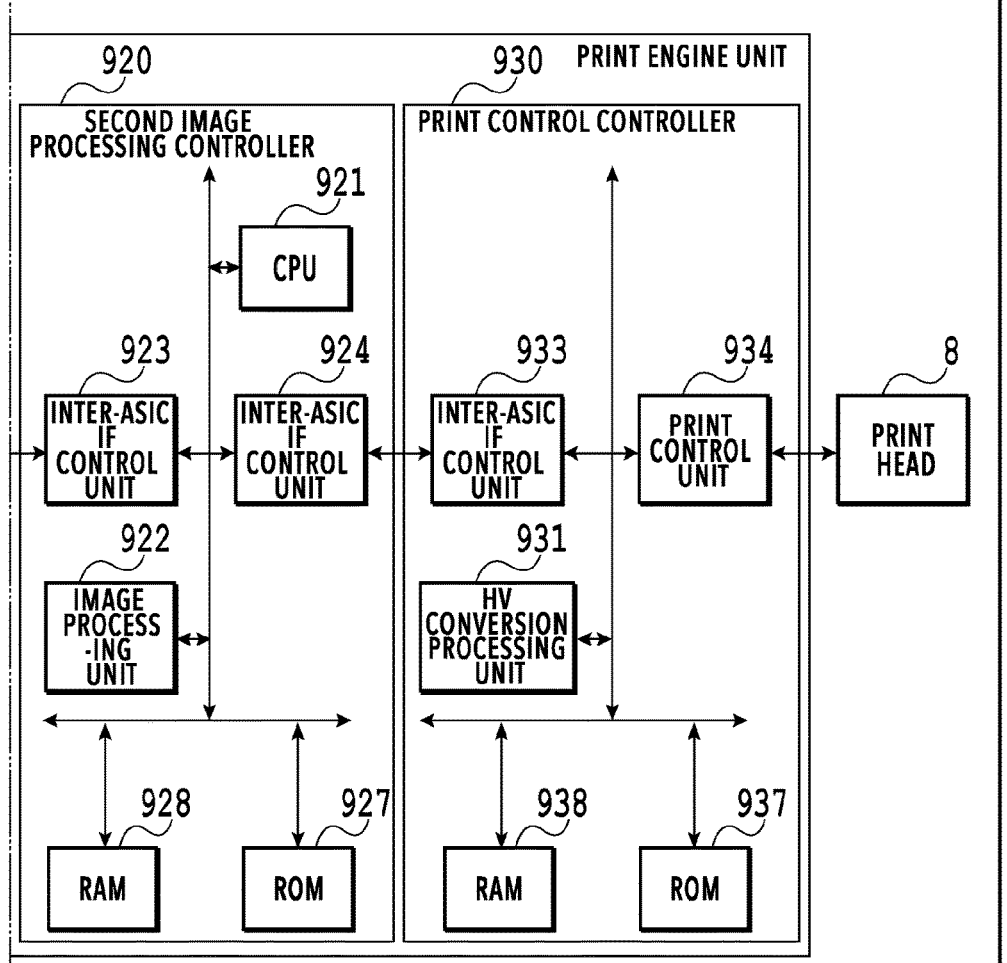
FIG. 4A is a diagram showing the relationship between FIG. 4A-1 and FIG. 4A-2.

In the present embodiment, a print engine unit includes a plurality of image processing controllers and image data generated by the controller unit is divided and image processing is performed in parallel by each of the plurality of image processing controllers.
<About Configuration of Printing Apparatus>
FIG. 4A is a block diagram showing a control configuration of the printing apparatus 1 in the present embodiment. As shown in FIG. 4A, the printing apparatus 1 includes a controller unit 900 and a print engine unit 940 including a first image processing controller 910, a second image processing controller 920, and a print control controller 930. As described above, the printing apparatus 1 in the present embodiment includes the four controllers. Of these controllers, the controller unit 900 functions as a main controller that generates image data for which image processing is performed in the first image processing controller 910 and the second image processing controller 920. Further, the first image processing controller 910 and the second image processing controller 920 function as a sub controller for the controller unit 900.

In the controller unit 900, processing to generate image data that can be processed in the first image processing controller 910 and the second image processing controller 920 is performed based on an input print job. For example, a renderer processing unit 902 of the controller unit 900 generates image data corresponding to one page based on page description language (hereafter, PDL) data sent from the host apparatus 400 via an IF control unit 904. Further, for example, a scanner image processing unit 903 generates image data corresponding to one page based on scan data sent from the scanner engine unit 300 via a scanner IF control unit 905. The image data generated in the renderer processing unit 902 or the scanner image processing unit 903 is temporarily stored in a RAM 908 of the controller unit 900 and transmitted to the first image processing controller 910 or the second image processing controller 920 by being divided. Hereafter, the area within the RAM in which transmission-target image data is stored is called a transmission buffer area.

The image data stored in the transmission buffer area is transmitted to the first image processing controller 910 via an inter-ASIC IF control unit 906 and stored in a RAM 918 of the first image processing controller 910. Hereafter, the area of the RAM in which received image data is stored is called a reception buffer area. In the present embodiment, it is assumed that the inter-ASIC IF is PCIExpress (PCIe) and protocol processing and DMA control in PCIe are performed in the inter-ASIC IF control unit 906.

A CPU 911 of the first image processing controller 910 determines whether the image data stored in the reception buffer area of the RAM 918 is image data for which image processing to generate print data (referred to as print data generation processing) should be performed in the first image processing controller 910. As a result of this, in the case of determining that the image data is image data for which the print data generation processing should be performed in the first image processing controller 910, the CPU 911 commands an image processing unit 912 to generate print data based on the image data stored in the reception buffer area of the RAM 918. On the other hand, in the case of determining that the image data is not image data for which the print data generation processing should be performed in the first image processing controller 910, the CPU 911 transfers the image data stored in the reception buffer area of the RAM 918 to the second image processing controller 920 via an inter-ASIC IF control unit 914. This image data is stored in a reception buffer area of a RAM 928 of the second image processing controller 920.

The print data generated by the image processing unit 912 based on the image data stored in the reception buffer area of the RAM 918 is stored in the RAM 918. Hereafter, the area of the RAM in which print data is stored is called a print buffer area. The print data stored in the print buffer area of the RAM 918 is transmitted to the second image processing controller 920 via the inter-ASIC IF control unit 914 and stored in the print buffer area of the RAM 928.

An image processing unit 922 of the second image processing controller 920 generates print data based on the image data stored in the reception buffer area of the RAM 928. The print data generated in the image processing unit 922 is stored in the print buffer area of the RAM 928. As described above, in the print buffer area of the RAM 928, the print data generated in the first image processing controller 910 is also stored, and finally, in the print buffer area, print data corresponding to one page is generated.

In a case when generation of print data corresponding to one page is completed in the print buffer area of the RAM 928, a CPU 921 notifies the print control controller 930 of the start of printing based on the print data corresponding to the one page. After the notification, the CPU 921 transmits the print data stored in the print buffer area of the RAM 928 to the print control controller 930 via an inter-ASIC IF control unit 924. The print data transmitted to the print control controller 930 is stored in a RAM 938.

The print control controller 930 receives print data after being notified of the start of printing by the second image processing controller 920 and stores the received print data in the RAM 938. After this, an HV conversion processing unit 931 performs HV conversion processing for the print data stored in the RAM 938. The print data rearranged by the HV conversion processing is stored in the RAM 938 again. A print control unit 934 controls the printing operation to form an image on a printing medium, such as a sheet, by transmitting the print data after the HV conversion processing stored in the RAM 938 to the print head 8.

<About Series of Image Processing for Generating Print Data Performed in Image Processing Controller>

In the following, a series of image processing for generating print data performed in the first image processing controller 910 and the second image processing controller 920 is explained.

Figure 4B:
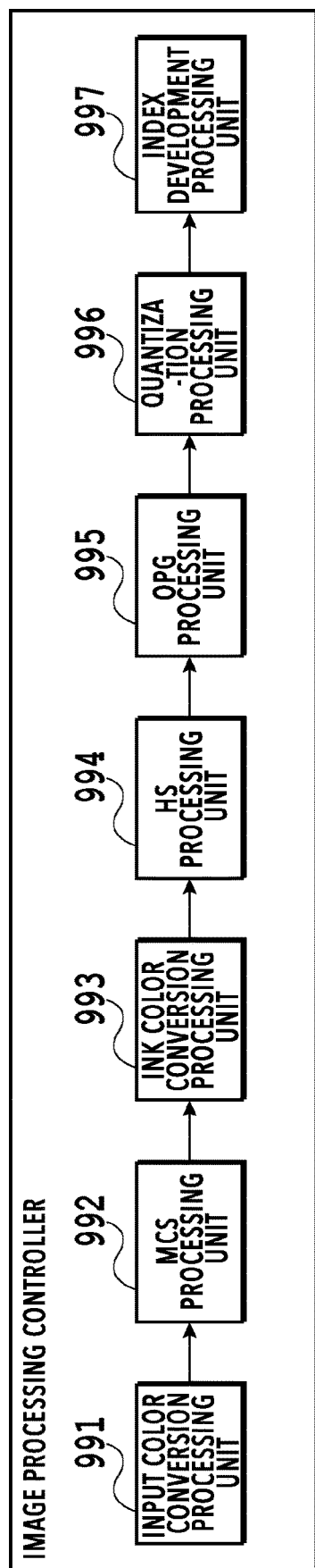

FIG. 4B is a block diagram showing a configuration that each of the first image processing controller 910 and the second image processing controller 920 includes. As shown in FIG. 4B, each image processing controller includes an input color conversion processing unit 991, an MCS processing unit 992, an ink color conversion processing unit 993, an HS processing unit 994, an OPG processing unit 995, a quantization processing unit 996, and an index development processing unit 997. Details of each component will be described later by using FIG. 5.

Figure 5:
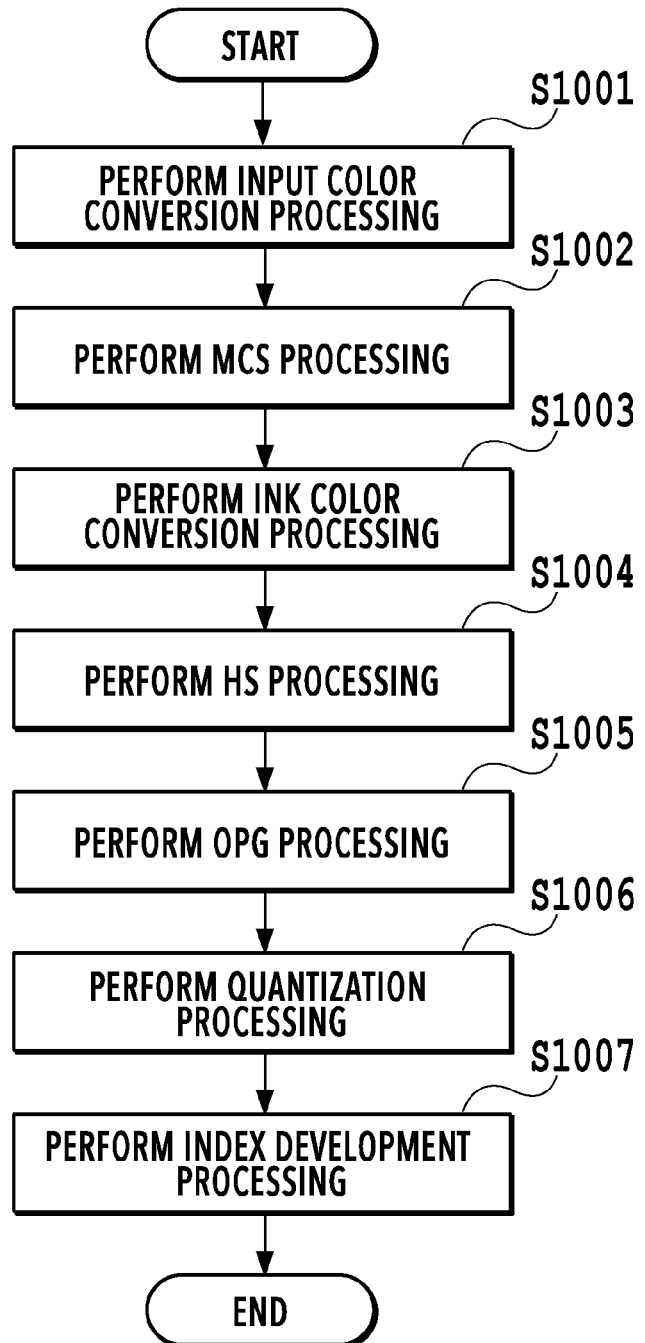
FIG. 5 is a flowchart of a series of image processing performed in the image processing controller in the first embodiment.

FIG. 5 is a flowchart of a series of image processing performed in the image processing controller.

At step S1001, the input color conversion processing unit 991 performs input color conversion processing to convert input image data into image data corresponding to a color reproduction area of the printing apparatus 1. The input image data is, for example, data indicating color coordinates (R, G, B) in color space coordinates, such as sRGB, which are representation colors of a monitor. For example, the input color conversion processing unit 991 converts input image data of R, G, and B, each being represented by eight bits, into image data (R', G', B') of the color reproduction area of the printing apparatus 1 by an already-known method, such as matrix operation processing and processing using a three-dimensional lookup table (hereafter, 3DLUT). In the present embodiment, the input color conversion processing is performed by using the 3DLUT and also using an interpolation operation.

At step S1002, the multicolor shading (MCS) processing unit 992 performs MCS processing to correct a difference in hue for the image data converted in the input color conversion processing unit 991, that is, the image data (R', G', B') of the color reproduction area of the printing apparatus 1. As a result of the MCS processing, the image data (R', G', B') of the color reproduction area of the printing apparatus 1 is converted into image data (R", G", B"). In this MCS processing, by performing conversion processing using a 3DLUT corresponding to each unit area of a plurality of 3DLUTs, image data is converted for each unit area. By performing the MCS processing, it is made possible to reduce a color difference resulting from the variations in the ejection characteristics of the nozzle in the print head 8, which cannot be corrected by the HS processing alone at the subsequent step S1004. The MCS processing will be described later by using FIG. 7.

At step S1003, the ink color conversion processing unit 993 performs ink color conversion processing to convert the image data (R", G", B") of R, G, and B, each being represented by eight bits, processed by the MCS processing unit 992 into image data by color signal data of ink. The printing apparatus 1 in the present embodiment uses inks of black (K), cyan (C), magenta (M), and yellow (Y), and therefore, the image data of RGB signals is converted into image data including an 8-bit color signal of each of K, C, M, and Y. As in the case with the input color conversion processing unit at step S1001, the ink color conversion processing at this step is also performed by using a 3DLUT and also using an interpolation operation.

At step S1004, the head shading (HS) processing unit 994 performs head shading processing to convert the image data including an 8-bit color signal of each of K, C, M, and Y into image data of an ink color signal in accordance with the amount of ejection of each nozzle making up the print head. In the HS processing, conversion processing using a one-dimensional lookup table (hereafter, 1DLUT) determined in accordance with the ink color and the position in the nozzle array direction is performed. The HS processing will be described later by using FIG. 6A and FIG. 6B.

At step S1005, the output gamma (OPG) processing unit 995 performs gamma correction processing using a 1DLUT for OPG processing for each ink color for the image data including ink color signals, each being represented by eight bits, for which the HS processing has been performed.

At step S1006, the quantization processing unit 996 performs quantization processing to reduce the number of tone levels of multivalued image data (in the present embodiment, image data in which each pixel has an 8-bit value corresponding to each of C, M, Y, and K) of the ink colors after the gamma correction processing. The method of the quantization processing performed at this step is not limited in particular. For example, it may also be possible to use the error diffusion method or pseudo halftone processing, such as the dither method using a threshold value matrix.

At step S1007, the index development processing unit 997 performs index development processing to generate 1-bit binary data indicating print "1" or non-print "0" based on the image data whose number of tone levels has been reduced at step S1006. The above is the contents of the series of image processing for generating print data performed in the image processing controller in the present embodiment.

<About Head Shading Processing>

In the following, the head shading (HS) processing performed at step S1004 described above is explained by using FIG. 6A and FIG. 6B.

FIG. 6A is a diagram explaining an outline of the HS processing.

Symbol 1101 and symbol 1102 indicate how a single color image is output in a case when printing is performed without performing the HS processing. In detail, symbol 1101 indicates how a cyan (C) image is output in a case when printing is performed without performing the HS processing. As shown schematically, although printing is performed in accordance with the same C signal value, a portion whose density is low occurs at the position somewhat to the left from the center. Further, symbol 1102 indicates how a magenta (M) image is output in a case when printing is performed without performing the HS processing. As shown schematically, although printing is performed in accordance with the same M signal value, periodic unevenness in density occurs. As described above, an error in the amount of ejection at each nozzle, which results from a difference in the diameter of the ejection port, appears as unevenness in density, and therefore, it is necessary to suppress unevenness in density by correcting the signal value for each ink color. Consequently, in the present embodiment, the HS processing is performed.

Symbol 1103 and symbol 1104 indicate how a single color image is output in a case when printing is performed by performing the HS processing. In detail, symbol 1103 indicates how a cyan (C) image is output in a case when printing is performed based on image data for which the HS processing has been performed. By correcting the C signal value by the HS processing, specifically, by increasing the C signal value at the portion whose density is low, as shown schematically, unevenness in density no longer occurs. Further, symbol 1104 indicates how a magenta (M) image is output in a case when printing is performed based on image data for which the HS processing has been performed. By correcting the M signal value by the HS processing, specifically, by changing the M signal value to a value that varies periodically, as shown schematically, unevenness in density no longer occurs.

FIG. 6B is an explanatory diagram of the HS processing and shows that the number of dots is corrected in units of a plurality of successive nozzles (in the example, four nozzles) by performing the HS processing.

First, a nozzle row of cyan (C) is explained. Symbol 1111 and symbol 1112 show the nozzle rows of cyan (C). In this example, as shown schematically, the ejection port diameter of each nozzle of the first nozzle group 1111 is greater than the ejection port diameter of each nozzle of the second nozzle group 1112. Consequently, the amount of ejection at each nozzle of the first nozzle group 1111 is larger than the amount of ejection at each nozzle of the second nozzle group 1112.

Symbol 1115 and symbol 1116 show results of performing ejection onto a printing medium by the first nozzle group 1111 and the second nozzle group 1112 in accordance with the C signal value different for each nozzle group, which are obtained as a result of converting the constant C signal value independent of the nozzle array direction by the HS processing. Here, the area 1115 corresponds to the first nozzle group 1111 and the area 1116 corresponds to the second nozzle group 1112. As shown schematically, the number of dots in the area 1115 is smaller than the number of dots in the area 1116.

Following the above, a nozzle row of magenta (M) is explained. Symbol 1113 and symbol 1114 show the nozzle rows of magenta (M). In this example, as shown schematically, the position in the nozzle array direction of the third nozzle group 1113 is the same as that of the first nozzle group 1111 and the position in the nozzle array direction of the fourth nozzle group 1114 is the same as that of the second nozzle group 1112. Further, the ejection port diameter of each nozzle of the third nozzle group 1113 is less than the ejection port diameter of each nozzle of the fourth nozzle group 1114. Consequently, the amount of ejection at each nozzle of the third nozzle group 1113 is smaller than the amount of ejection at each nozzle of the fourth nozzle group 1114.

Symbol 1117 and symbol 1118 show results of performing ejection onto a printing medium by the third nozzle group 1113 and the fourth nozzle group 1114 in accordance with the M signal value different for each nozzle group, which are obtained as a result of converting the constant M signal value independent of the nozzle array direction by the HS processing. Here, the area 1117 corresponds to the third nozzle group 1113 and the area 1118 corresponds to the fourth nozzle group 1114. As shown schematically, the number of dots in the area 1117 is larger than the number of dots in the area 1118.

As described above, by correcting the signal value for each ink color by the HS processing and changing the number of dots for each nozzle group, it is made possible to reduce the unevenness in density. In FIG. 6B, a case is explained where the unit in which the number of dots is corrected is four nozzles, but this unit is not limited to four nozzles and the unit may be any number of nozzles larger than or equal to two.

<About Multicolor Shading Processing>

In the following, the multicolor shading (MCS) processing performed at step S1002 described above is explained. As described above, the MCS processing is processing to convert image data for each unit area and, in other words, processing to correct the RGB signal in units of several nozzles by applying the same parameter to a plurality of successive nozzles. Here, the unit at the time of correcting the RGB signal by the MCS processing, that is, the number of nozzles included in the nozzle group may be the same as the unit (number of nozzles) at the time of correcting the CMYK signal by the HS processing described above, or may be different.

Figure 7:
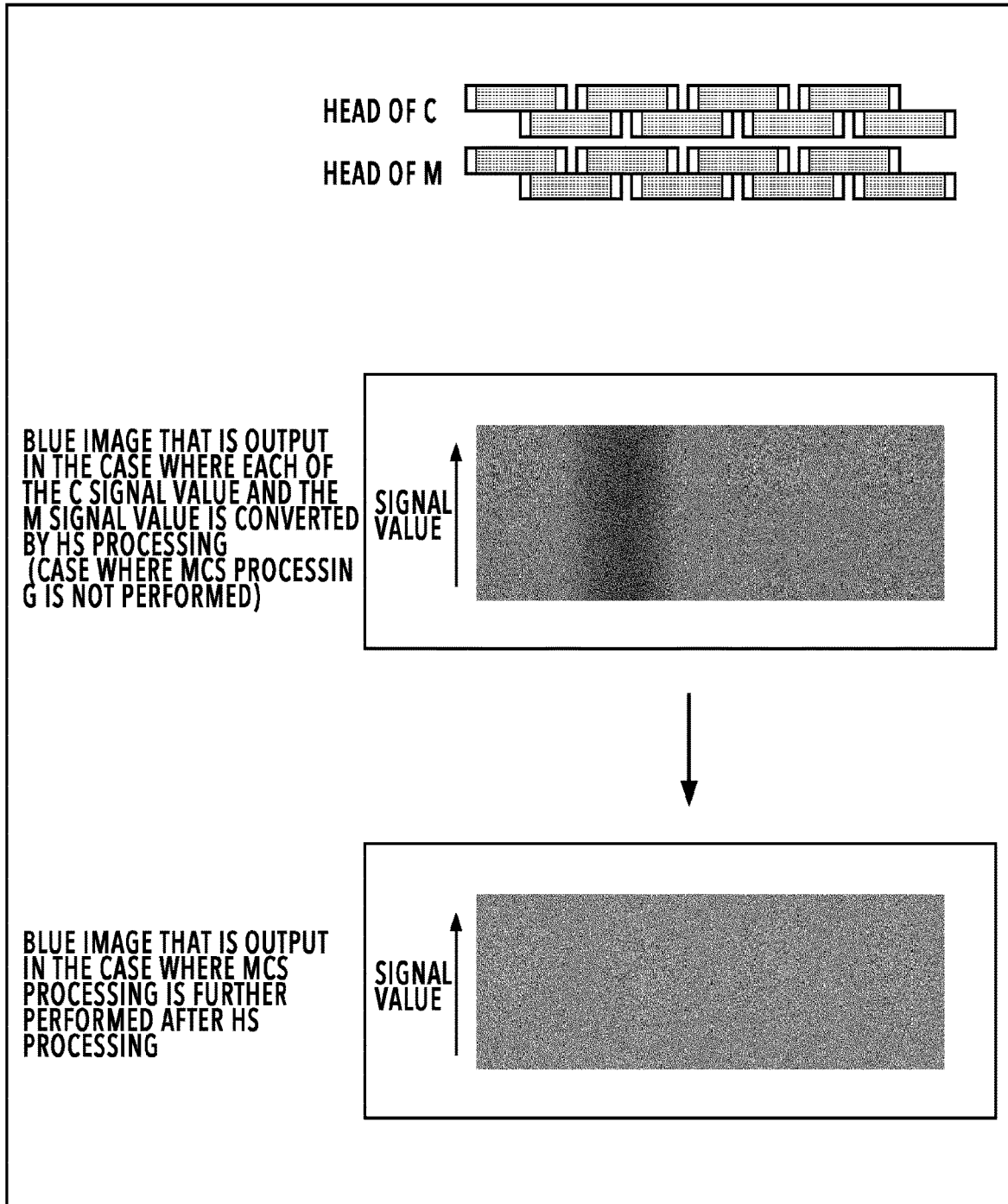
FIG. 7 is an explanatory diagram of color shading processing.

FIG. 7 is a diagram showing effects of the MCS processing and showing a case when a blue image is output by using the cyan (C) ink and the magenta (M) ink. As shown schematically, by performing the MCS processing, in addition to the HS processing, it is possible to remove the unevenness in color that cannot be corrected sufficiently only by the HS processing for each ink color.

<About Restrictions at the Time of Transmitting Image from Controller Unit to Image Processing Controller>

As described so far, in the present embodiment, the print engine unit 940 includes the two image processing controllers. Then, the image data generated by the controller unit 900 is divided into two pieces of image data and a series of image processing is performed for the divided image data in parallel by the two image processing controllers, respectively. Here, in the case of transmitting the image data generated by the controller unit 900 to the two image processing controllers by dividing the image data, there are two restrictions that should be noted in order to implement efficient processing without idling the two image processing controllers.

Figure 8A:
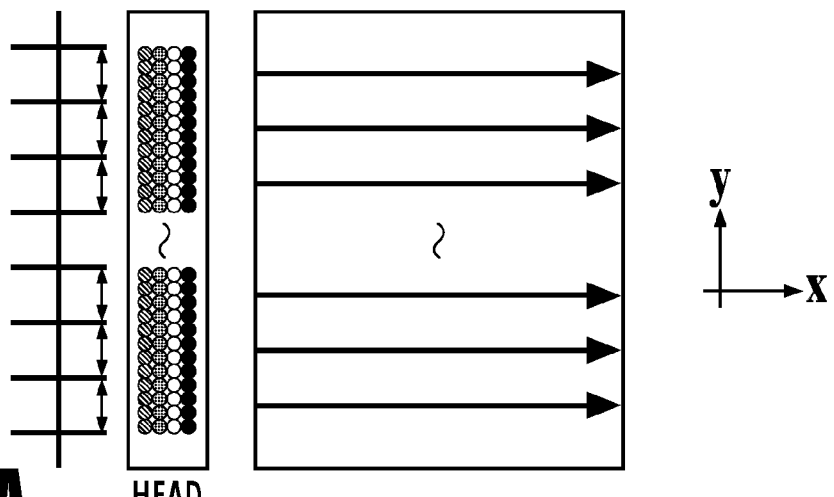
FIG. 8A to FIG. 8C are explanatory diagrams of processing in the first embodiment.

First, the first restriction is explained. FIG. 8A is a diagram showing a position relationship between the nozzle array direction of each ink in the print head 8 and the ideal HS processing direction. As described above, the HS processing is image processing to correct the signal value of each ink color in units of a plurality of successive nozzles (in this example, four nozzles). That is, in the HS processing, the parameter of the same table is applied in units of a plurality of successive nozzles, and therefore, the ideal processing direction in the HS processing is the direction that does not require switching of tables on the way, that is, the direction (x-direction) perpendicular to the nozzle array direction (y-direction). What is described here also applies to the MCS processing. That is, the ideal processing direction in the MCS processing is also the direction (x-direction) perpendicular to the nozzle array direction (y-direction).

Consequently, in a case when the HS processing (or MCS processing) is performed in order from top along the x-direction in FIG. 8A, the number of times tables are switched becomes the smallest, and therefore, the highest processing efficiency will result. Consequently, it is desirable for the controller unit 900 to transmit the generated image data to the first image processing controller 910 or the second image processing controller 920 in units of a plurality of nozzles, that is, in units of bands.

Figure 8B:
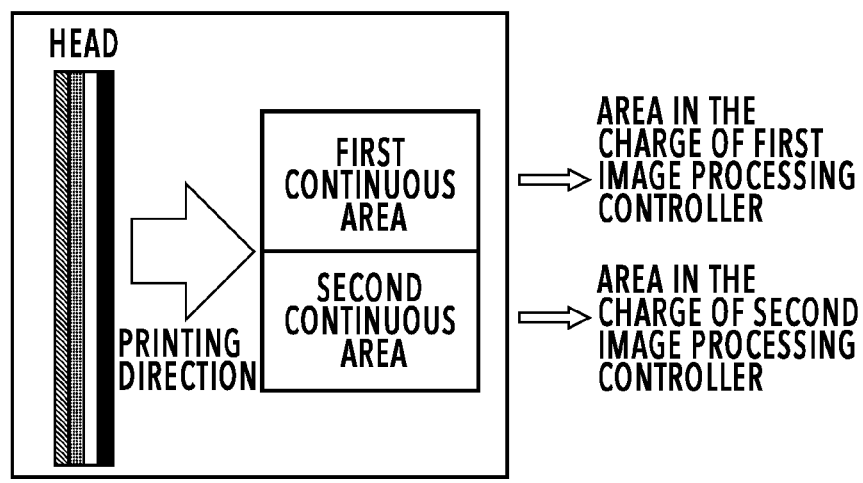

Following the above, the second restriction is explained. FIG. 8B is a diagram showing the nozzle array direction of each ink in the print head 8, the printing direction, and the position relationship between the area for which image processing is performed in the first image processing controller 910 and the area for which image processing is performed in the second image processing controller 920. Hereafter, the area for which image processing is performed in the first image processing controller 910 is called the area in the charge of the first image processing controller 910 and the area for which image processing is performed in the second image processing controller 920 is called the area in the charge of the second image processing controller 920.

In the processing performed by the first image processing controller 910 and the second image processing controller 920, processing that refers to surrounding pixels, such as quantization processing using error diffusion, is included. Consequently, from the viewpoint of processing efficiency, it is desirable for the image data that the controller unit 900 delivers to the image processing controller to have continuity, that is, to be image data in a continuous area. Because of this, in this example, as shown in FIG. 8B, the upper half area within the image data corresponding to one page is taken to be the area in the charge of the first image processing controller 910 and the lower half area is taken to be the area in the charge of the second image processing controller 920. As described above, each of the image processing controllers corresponds to each of a plurality of continuous areas obtained by dividing image data corresponding to one page, whose positions in the direction perpendicularly intersecting with the direction of the relative movement of the printing media and the print unit (nozzle) are different.

<About Processing Performed in Controller Unit>

Figure 9:
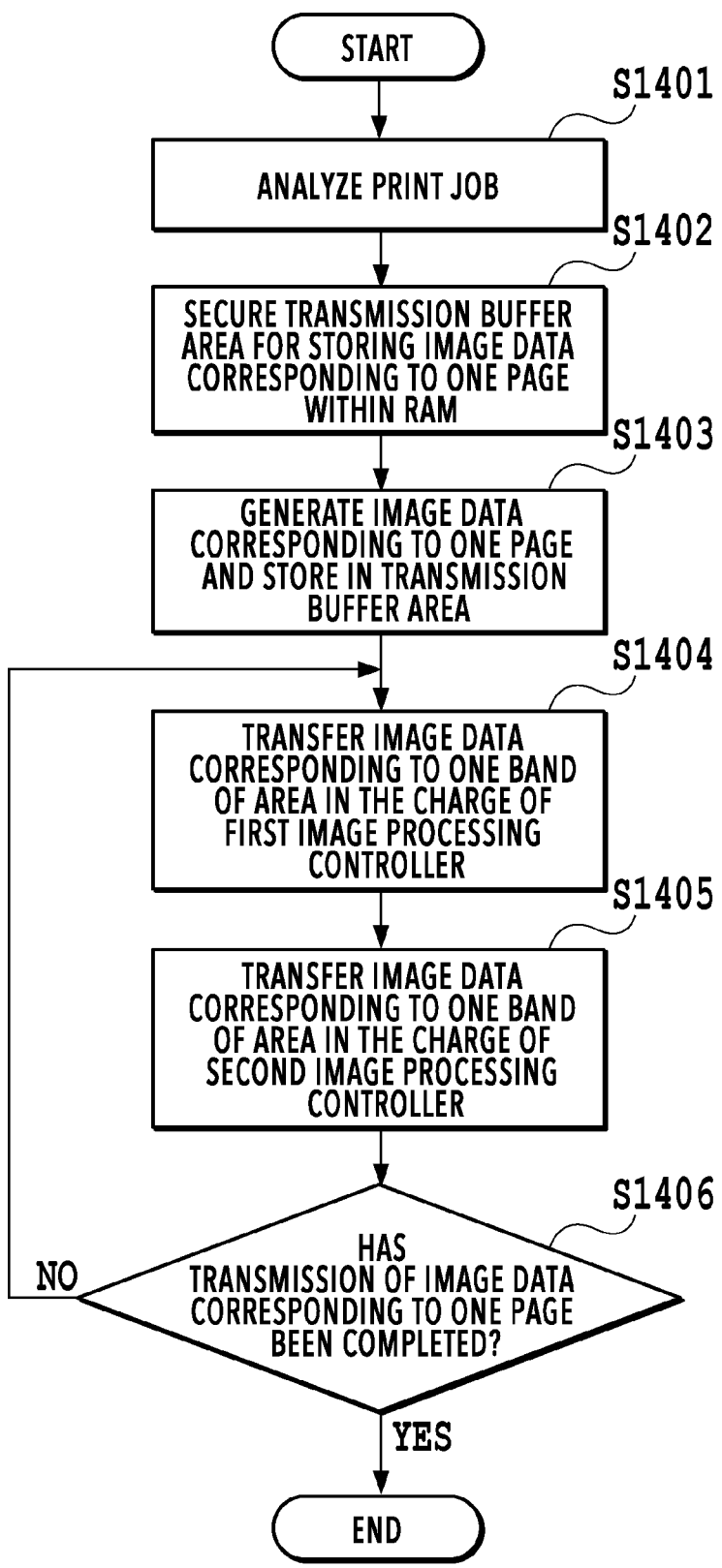
FIG. 9 is a flowchart of processing performed in a controller unit in the first embodiment.

The controller unit 900 in the present embodiment is characterized in transmitting image data to the image processing controller while being imposed by the above-described restrictions. In the following, a series of processing performed by the controller unit 900 in the present embodiment is explained by using FIG. 9.

At step S1401, a CPU 901 acquires printing mode information as well as determining whether a print job is a PDL job or a COPY job by analyzing the print job. In the printing mode information, information indicating a resolution (that is, information indicating whether the mode is a high-resolution mode, a normal mode, or a low-resolution mode), information indicating whether the mode is a monochrome mode or a color mode, information on the width of a sheet, and so on are included. Here, the high-resolution mode is a mode in which printing is performed with a resolution of 1,200 dpi×1,200 dpi, the normal mode is a mode in which printing is performed with a resolution of 600 dpi×600 dpi, and the low-resolution mode is a mode in which printing is performed with a resolution of 300 dpi×300 dpi. Then, the CPU 901 generates parameter information necessary for processing in the image processing controller in accordance with the acquired printing mode information. In the parameter information generated at this step, a magnification of enlargement/reduction and values held in the 3DLUT used in the ink color conversion processing described above are included. Further, in the parameter information, information indicating how many bands in total, to which image data corresponds, are transmitted in order to complete transmission of image data corresponding to one page, and information on the label number indicating which image processing controller is caused to perform image processing for each piece of image data corresponding to one band are also included.

At step S1402, the CPU 901 secures a transmission buffer area for storing image data corresponding to one page, which is transmitted to the image processing controller, within the RAM 908.

Figure 8C:
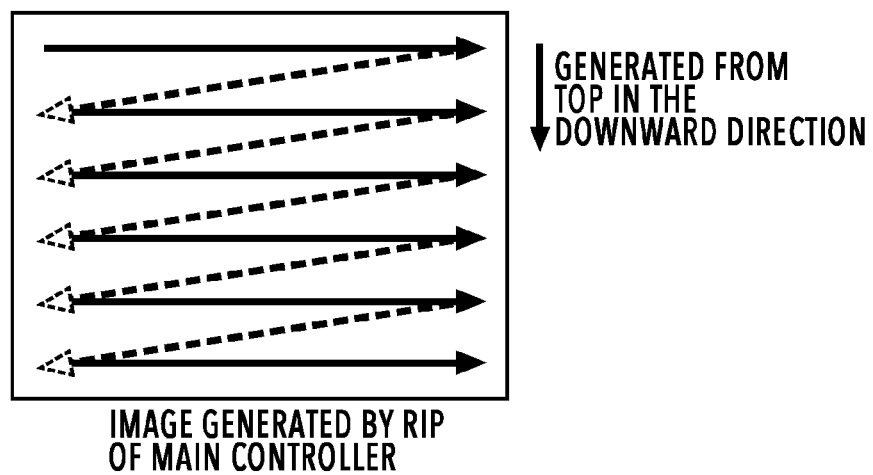

At step S1403, the CPU 901 generates image data that the image processing controller can process based on the print job. Specifically, in a case when the print job is a PDL job, the CPU 901 commands the renderer processing unit 902 to perform rendering processing (also called rasterize processing, RIP processing) based on PDL data included in the print job. On the other hand, in a case when the print job is a COPY job, the CPU 901 commands the scanner image processing unit 903 to perform image correction processing for image data included in the print job. At this step, as shown in FIG. 8C, from the top portion, in units of raster, image data corresponding to one page, which the image processing controller can process, is generated and stored in the transmission buffer area of the RAM 908.

At step S1404, the CPU 901 transmits the upper half area of the image data stored in the transmission buffer area of the RAM 908, that is, the image data corresponding to one band within the area in the charge of the first image processing controller 910 to the first image processing controller 910. Specifically, the CPU 901 commands a DMA controller (hereafter, DMAC) within the inter-ASIC IF control unit 906 to transfer the image data corresponding to one band to the first image processing controller 910 by a DMA (Direct Memory Access) method. The DMAC having received the command transfers the image data corresponding to one band and the information on the label number to the first image processing controller 910. Here, the information on the label number is information used for identifying the image processing controller that performs the above-described image processing (see FIG. 5) for the image data corresponding to one band, which is transmitted at this step. At this step, as the information on the label number, which is transferred, the parameter indicating that the image processing controller that performs the image processing is the first image processing controller 910 is used. The image data corresponding to one band, which is transmitted at this step, is the image data whose image processing is in the charge of the first image processing controller 910, and therefore, the image data is finally stored in the reception buffer area of the RAM 918.

At step S1405, the CPU 901 transmits the lower half area of the image data stored in the transmission buffer area of the RAM 908, that is, the image data corresponding to one band within the area in the charge of the second image processing controller 920 to the second image processing controller 920. Specifically, the CPU 901 commands the DMAC within the inter-ASIC IF control unit 906 to transfer the image data corresponding to one band to the second image processing controller 920 by the DMA method. The DMAC having received the command transfers the image data corresponding to one band and the information on the label number to the second image processing controller 920 via the first image processing controller 910. At this step, as the information on the label number, which is transferred, the parameter indicating that the image processing controller that performs the image processing is the second image processing controller 920 is used. The image data corresponding to one band that is transmitted at this step is the image data whose image processing is in the charge of the second image processing controller 920, and therefore, the image data is finally stored in the reception buffer area of the RAM 928.

As described above, in the present embodiment, at step S1404 and step S1405, image data corresponding to one band is transferred alternately to the first image processing controller 910 and the second image processing controller 920 (called alternate transfer). FIG. 10A is a diagram showing the transfer aspect of image data in the present embodiment, that is, showing a case when image data corresponding to one band is transferred alternately to the first image processing controller 910 and the second image processing controller 920.

At step S1406, the CPU 901 determines whether the transmission of image data corresponding to one page, which is stored in the transmission buffer area, has been completed. Specifically, a determination is performed based on the information generated at step S1401, indicating how many bands in total, to which the image data corresponds, are transmitted in order to complete the transmission of image data corresponding to one page, and the number of times of the interrupt of the DMAC, indicating that the transfer of image data corresponding to one band has been completed. That is, in a case when the accumulated number of times of the interrupt has reached a threshold value indicating that transmission of image data corresponding to one page has been completed, it is determined that transmission of image data corresponding to one page has been completed. In a case when the determination results at step S1406 are affirmative, the series of processing is terminated. On the other hand, in a case when the determination results are negative, the processing returns to step S1404 and transmission of image data is continued. As described above, the controller unit 900 performs repetitive transmission processing to repeat transmission of generated image data corresponding to one band each time in the ascending order from the first image processing controller 910 to each image processing controller. Repeating transmission in the ascending order means that, in a case when the print engine unit includes N image processing controllers, image data is transmitted in the order of the first image processing controller, the second image processing controller, . . . , and the Nth image processing controller and this is repeated. It may also be possible to repeat transmission in the descending order (in the order of the Nth image processing controller, . . . , the second image processing controller, and the first image processing controller). What is required is that transmission of the next band image to all of the image processing controllers is performed after image data corresponding to one band (also called band image) is transmitted to all the image processing controllers and this is repeated. The above is the contents of the processing performed in the controller unit 900 in the present embodiment.

About Modification Example of the Present Embodiment

In the example described above, a case is explained where the print engine unit includes two image processing controllers and image data corresponding to one page is divided into two continuous areas. However, the present embodiment is not limited to this case. For example, the print engine unit may include three image processing controllers and image data corresponding to one page may be divided into three continuous areas. Alternatively, the print engine unit may include four image processing controllers and image data corresponding to one page may be divided into four continuous areas. That is, it is possible to apply the present embodiment to a case when the print engine unit includes a plurality of (N) image processing controllers and image data corresponding to one page is divided into N continuous areas.

Alternatively, such an embodiment is also considered in which the print engine unit includes two image processing controllers and image data corresponding to one page is divided into four continuous areas, and the two image processing controllers are in charge of two continuous areas, respectively.

Further, in the example described above, a case is explained where the printing apparatus includes a controller unit and a plurality of image processing controllers, but the present embodiment is not limited to this case. For example, the processing shown in FIG. 5 and FIG. 9 may be performed on the side of the host apparatus that transmits a print job to the printing apparatus. That is, the information processing apparatus, not the printing apparatus, may include part or all of the controller unit and the plurality of image processing controllers.

Further, in the example described above, a case is explained where the transmission order of image data of the first band to the image processing controller and the transmission order of image data of the second band to the image processing controller are the same. That is, after the image data of the first band of the area in the charge of each image processing controller is transmitted in the order of the first image processing controller and the second image processing controller, the image data of the second band of the area in the charge of each image processing controller is transmitted in the order of the first image processing controller and the second image processing controller. However, the transmission order of the image data of the first band to the image processing controller and the transmission order of the image data of the second band to the image processing controller may be different.

<About Effect of the Present Embodiment>

By the present embodiment, it is made possible to cause the image processing controllers to operate in parallel without idling the image processing controllers. Further, the reception buffer area that the image processing controller needs to secure may be as small as that corresponding to one band of image data, and therefore, even in a case when the RAM capacity of the image processing controller is small, it is made possible to enable parallel processing of image processing and to implement high-speed printing.

Second Embodiment

In the first embodiment, efficient parallel processing is implemented by securing the transmission buffer area for storing image data corresponding to one page within the RAM of the controller unit and by alternately transferring image data by one band each time to different image processing controllers. In contrast to this, in the present embodiment, a case is supposed where it is difficult to secure the transmission buffer area for storing image data within the RAM of the controller unit because the capacity of the image data corresponding to one page is very large. In the present embodiment, in such a case, image data is transmitted to a plurality of image processing controllers while saving the transmission buffer area of the controller unit. In the following, differences from the already-described embodiment are explained mainly and explanation of the same contents as those of the already-described embodiment is omitted appropriately.

<About Processing Performed in Controller Unit>

Figure 11A:
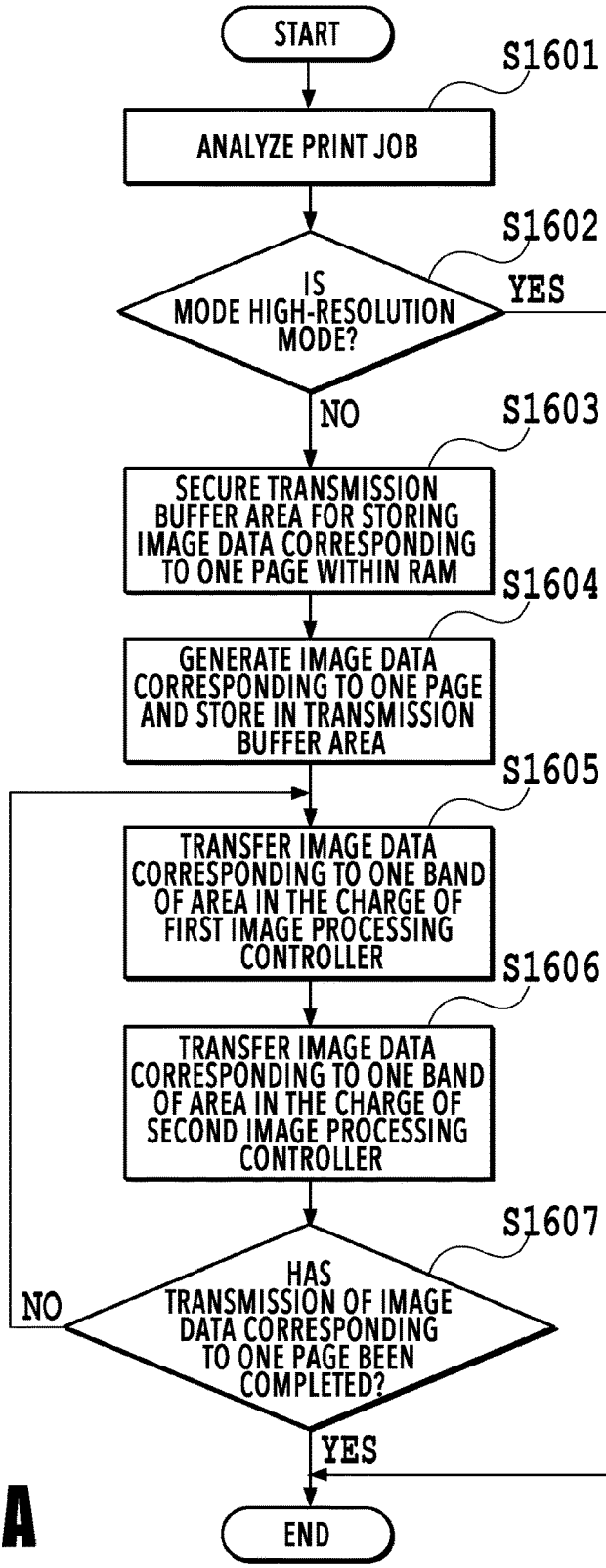
FIG. 11A and FIG. 11B are flowcharts of processing performed in a controller unit in the second embodiment.
Figure 11B:
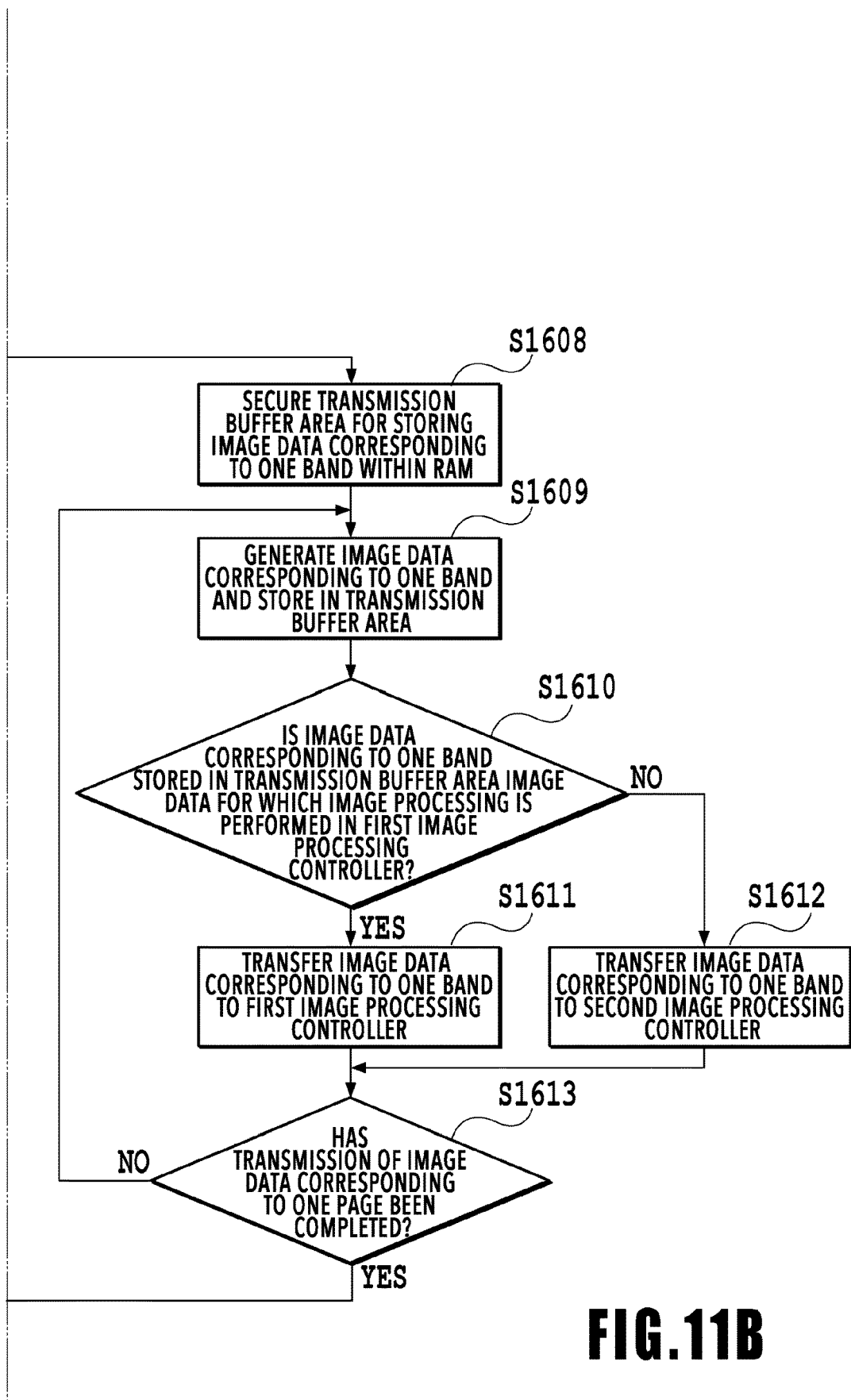

In the following, processing performed in the controller unit 900 in the present embodiment is explained by using FIG. 11A and FIG. 11B.

At step S1601, the CPU 901 analyzes a print job. This step is the same as step S1401 of the first embodiment.

At step S1602, the CPU 901 determines whether a high-resolution mode is specified in the print job based on the analysis results at step S1601. In a case when the determination results at step S1602 are affirmative, the processing advances to step S1608. On the other hand, in a case when the determination results are negative, the processing advances to step S1603. The high-resolution mode is a mode in which printing is performed with a resolution of 1,200 dpi×1,200 dpi. It is also possible for the printing apparatus 1 to operate in a normal mode in which printing is performed with a resolution of 600 dpi×600 dpi or in a low-resolution mode in which printing is performed with a resolution of 300 dpi×300 dpi. Further, at this step, whether the mode is the high-resolution mode is determined, but it may also be possible to determine whether the capacity of image data to be generated is larger than a predetermined threshold value. In this case, on a condition that the capacity of image data to be generated is larger than a predetermined threshold value, the processing advances to step S1608. On the other hand, in a case when the capacity is smaller than or equal to the predetermined threshold value, the processing advances to step S1603.

Step S1603 to step S1607 to which the processing advances in a case when the mode is not the high-resolution mode (in the case of NO at step S1602) are the same as step S1402 to step S1406 of the first embodiment, and therefore, an explanation is omitted. In the following, a case when the mode is the high-resolution mode (in the case of YES at step S1602) is explained.

At step S1608, the CPU 901 secures the transmission buffer area for storing image data corresponding to one band, which is transmitted to the image processing controller, within the RAM 908. As described above, in the present embodiment, the transmission buffer area capable of storing image data corresponding to one page is not secured within the RAM 908 and the used area of the RAM 908 is saved.

At step S1609, the CPU 901 generates image data that can be processed by the image processing controller based on the print job. At step S1403 of the first embodiment, image data corresponding to one page is generated, but at this step, image data corresponding to one band is generated and stored in the transmission buffer area of the RAM 908. Further, with the image data corresponding to one band, which is generated at this step, the label number for identifying which of the first image processing controller 910 and the second image processing controller 920 is caused to perform image processing is associated. Information on this label number is also stored in the RAM 908.

At step S1610, the CPU 901 determines whether the image data corresponding to one band, which is stored in the transmission buffer area at the immediately previous step S1609, is image data for which image processing is performed in the first image processing controller 910 based on the label number. In a case when the determination results at step S1610 are affirmative, the processing advances to step S1611. On the other hand, in a case when the determination results are negative, the processing advances to step S1612.

In the case of YES at step S1610, the CPU 901 transmits the image data corresponding to one band, which is stored in the transmission buffer area at the immediately previous step S1609, to the first image processing controller 910 at step S1611. Specifically, the CPU 901 commands the DMAC within the inter-ASIC IF control unit 906 to transfer the image data corresponding to one band to the first image processing controller 910 by the DMA method. The DMAC having received the command transfers the image data corresponding to one band and information on the label number to the first image processing controller 910. At this step, as the information on the label number, which is transferred, the parameter indicating that the image processing controller that performs the image processing is the first image processing controller 910 is used. The image data corresponding to one band, which is transmitted at this step, is the image data whose image processing is in the charge of the first image processing controller 910, and therefore, the image data is finally stored in the reception buffer area of the RAM 918.

In the case of NO at step S1610, the CPU 901 transmits the image data corresponding to one band, which is stored in the transmission buffer area at the immediately previous step S1609, to the second image processing controller 920 at step S1612. Specifically, the CPU 901 commands the DMAC within the inter-ASIC IF control unit 906 to transfer the image data corresponding to one band to the second image processing controller 920 by the DMA method. The DMAC having received the command transfers the image data corresponding to one band and the information on the label number to the second image processing controller 920 via the first image processing controller 910. At this step, as the information on the label number, which is transferred, the parameter indicating that the image processing controller that performs the image processing is the second image processing controller 920 is used. The image data corresponding to one band, which is transmitted at this step, is the image data whose image processing is in the charge of the second image processing controller 920, and therefore, the image data is finally stored in the reception buffer area of the RAM 928.

As above, in the present embodiment, the generated band images (see FIG. 8C) are sequentially transferred to the image processing controller in order from the top in the controller unit 900 (called sequential transfer). Consequently, first, the image data whose image processing is performed in the first image processing controller 910 is transferred to the first image processing controller 910 by one band each time, and as a result of this, the image data corresponding to the continuous areas, which is in the charge of the first image processing controller 910, is transferred to the first image processing controller 910. After this, the image data whose image processing is performed in the second image processing controller 920 is transferred to the second image processing controller 920 by one band each time, and as a result of this, the image data corresponding to the continuous areas, which is in the charge of the second image processing controller 920, is transferred to the second image processing controller 920. FIG. 10B is a diagram showing the transmission aspect of image data in the present embodiment.

Step S1613 is the same as step S1607, and therefore, an explanation is omitted. The above is the contents of the processing performed in the controller unit 900 in the present embodiment.

<About Effect of the Present Embodiment>

By the present embodiment, it is made possible to perform printing processing by adopting the sequential transfer method even in a case when it is difficult to secure a transmission buffer area for storing image data because the capacity of the image data corresponding to one page, which is generated by the controller unit, is large.

Third Embodiment

The present embodiment is applied in combination with the above-described embodiments. In the above-described embodiments, the image processing unit 912 and the image processing unit 922 perform the series of image processing shown in FIG. 10A or FIG. 10B as the processing to generate print data. In contrast to this, in the present embodiment, a case is supposed where after these image processing units perform the index development processing (step S1007), character quality improvement processing in accordance with contents of a printing mode is further performed. The character quality improvement processing is processing to improve the character quality only in the character area by performing processing (for example, zooming, and the like) to refer to surrounding pixels for a pixel of interest. The character quality improvement processing is processing to refer to surrounding pixels, and therefore, it is possible to further improve character quality by performing the processing by partially overlapping the continuous areas in the charge of the first image processing controller 910 and the continuous areas in the charge of the second image processing controller 920.

In such a case, the aspect in which the print engine unit transmits image data to the image processing controller becomes different from those in the above-described embodiments (see FIG. 10A, FIG. 10B). In the following, a specific explanation is given.

In the above-described embodiments, the controller unit 900 transmits the image of the area in the charge of the first image processing controller 910, that is, bands #0 to # N of the area in the charge of the first image processing controller 910 in FIG. 10A or FIG. 10B to the first image processing controller 910. In contrast to this, in the present embodiment, the controller unit 900 transmits band #0 of the area in the charge of the second image processing controller 920 after transmitting in order band #0 to band # N of the area in the charge of the first image processing controller 910 to the first image processing controller 910.

On the other hand, in the above-described embodiments, the controller unit 900 transmits the image of the area in the charge of the second image processing controller 920, that is, bands #0 to # N of the area in the charge of the second image processing controller 920 in FIG. 10A or FIG. 10B to the second image processing controller 920. In contrast to this, in the present embodiment, first, the controller unit 900 transmits band # N of the area in the charge of the first image processing controller 910 to the second image processing controller 920, and then transmits bands #0 to # N of the area in the charge of the second image processing controller 920.

As described above, in the present embodiment, the controller unit 900 transmits image data so that the area in the charge of the first image processing controller 910 and the area in the charge of the second image processing controller 920 partially overlap each other (so that there is a partial overlap between continuous areas adjacent to each other). However, in this case, it is necessary to cause the first image processing controller 910 to correctly determine which of the first image processing controller 910 and the second image processing controller 920 is caused to perform image processing for the image data of the overlap portion. However, it is difficult to perform such determination only by using the label number described above. Consequently, in the present embodiment, at the time of transmitting the image data of the overlap position, a flag for identifying which of the first image processing controller 910 and the second image processing controller 920 is caused to perform image processing is set newly. Due to this, in a case when image data corresponding to one band of the overlap portion is received, it is made possible for the first image processing controller 910 to determine whether to perform image processing in the first image processing controller 910 or to deliver the image data to the second image processing controller 920 based on the flag.

<About Effect of the Present Embodiment>

By the present embodiment, it is made possible to cause the image processing controllers to perform in parallel without idling them even in a case when character quality improvement processing is performed, and therefore, it is made possible to implement high-speed printing.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

By the present invention, it is made possible to quickly generate print data by causing a plurality of image processing controllers to operate in parallel without idling them.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus that processes data made use of for printing an image by relatively moving a printing unit and a printing medium, wherein the printing unit includes a plurality of printing elements arranged in a first direction, and wherein the relative movement is in a second direction that intersects with the first direction, the image processing apparatus comprising:
a plurality of processors and at least one memory, wherein the plurality of processors, in accordance with an instruction stored in the at least one memory, is configured to function as units comprising:
(1) an acquisition unit configured to acquire image data corresponding to an image of one page;
(2) a first processing unit configured to process first image data corresponding to a first processing area of the image by using a common parameter for each pixel arranged in the second direction, for generating first print data that is used for the printing unit;
(3) a second processing unit configured to process second image data corresponding to a second processing area of the image by using a common parameter for each pixel arranged in the second direction, for generating second print data that is used for the printing unit, wherein a position of the second processing area is different from a position of the first processing area in the first direction within one page, and wherein a printing element to be used for printing the first processing area is different from a printing element to be used for printing the second processing area; and
(4) a transmission unit configured to transmit the first image data to the first processing unit and to transmit the second image data to the second processing unit in a unit of band data corresponding to one band area, wherein the first processing area comprises a plurality of band areas, a length of each of the band areas of the first processing area is shorter than a length of the first processing area in the first direction, the second processing area comprises a plurality of band areas, and a length of each of the band areas of the second processing area is shorter than a length of the second processing area in the first direction, wherein (a) the transmission unit transmits a plurality of units of band data to the first processing unit, and (b) during a period extending from a start of the transmission of the plurality of units of band data to the first processing unit to an end of the transmission of the plurality of units of band data to the first processing unit, the transmission unit transmits at least one unit of band data to the second processing unit.

2. The image processing apparatus according to claim 1, wherein the acquisition unit comprises (a) a generation unit configured to generate the image data corresponding to the image of one page based on a print job and (b) a storage unit configured to temporarily store at least a portion of the generated image data.

3. The image processing apparatus according to claim 2, wherein the storage unit stores the entire image data corresponding to the image of one page.

4. The image processing apparatus according to claim 1, wherein the transmission unit alternately repeats transmission of a unit of band data to the first image processing unit and transmission of a unit of band data to the second image processing unit.

5. The image processing apparatus according to claim 1, wherein the first and second processing areas do not overlap in the first direction.

6. The image processing apparatus according to claim 1, wherein the first and second processing areas partially overlap in the first direction, and
wherein the processing by the first and second processing units includes quality improvement processing that refers to surrounding pixels in the second direction.

7. The image processing apparatus according to claim 1, wherein the processing by the first processing unit and the second processing unit includes head shading processing to convert a signal value by using the parameter in accordance with characteristics of the printing elements.

8. The image processing apparatus according to claim 1, wherein the processing by the first processing unit and the second processing unit includes quantization processing to reduce a number of tone levels of multivalued image data.

9. The image processing apparatus according to claim 1, wherein the first processing unit and the second processing unit process the pixels arranged in the second direction in order according to arrangement of the pixels in the second direction.

10. The image processing apparatus according to claim 1, wherein the band areas included in the first processing area are in continuous positions in the first direction, and
wherein the band areas included in the second processing area are in continuous positions in the first direction.

11. The image processing apparatus according to claim 10, wherein the transmission unit transmits the band areas included in the first processing area sequentially from one end to the other end in the first direction, and
wherein the transmission unit transmits the band areas included in the second processing area sequentially from one end to the other end in the first direction.

12. The image processing apparatus according to claim 10, wherein, in a case when a capacity of the image data corresponding to one page is less than or equal to a predetermined threshold value, the transmission unit transmits a plurality of units of band data to the first processing unit, and wherein, during a period extending from a start of the transmission of the plurality of units of band data to the first processing unit to an end of the transmission of the plurality of units of band data to the first processing unit, the transmission unit transmits at least one unit of band data to the second processing unit, and wherein, in a case when the capacity is greater than the predetermined threshold value, the transmission unit sequentially transmits at least one unit of band data to the second processing unit after transmitting all of band data corresponding to the first processing area to the first processing unit.

13. The image processing apparatus according to claim 1, wherein the first and second processing units start processing upon receipt of band data transmitted by the transmission unit.

14. The image processing apparatus according to claim 1, wherein a length of each of the band areas included in the first processing area is equal to a length of the first processing area in the second direction, and wherein a length of each of the band areas included in the second processing area is equal to a length of the second processing area in the second direction.

15. The image processing apparatus according to claim 1, further comprising a third processing unit configured to process third image data corresponding to a third processing area of the image by using a common parameter for each pixel arranged in the second direction, for generating third print data that is used for the printing unit, wherein a position of the third processing area is different from the positions of the first and second processing areas in the first direction within one page, wherein a printing element to be used for printing the third processing area is different from the printing elements to be used for printing the first and second processing areas, and wherein (a) the transmission unit transmits a plurality of units of band data to the first processing unit, and (b) during a period extending from a start of the transmission of the plurality of units of band data to the first processing unit to an end of the transmission of the plurality of units of band data to the first processing unit, the transmission unit transmits at least one unit of band data to the third processing unit.

16. The image processing apparatus according to claim 15, wherein the transmission unit comprises a plurality of processing units including the first processing unit, the second processing unit, and the third processing unit, and wherein the transmission unit transmits one unit of band data to each of the processing units and then repeats processing of transmitting a next unit of band data to each of the processing units.

17. The image processing apparatus according to claim 1, wherein the first processing unit is an application specific integrated circuit (ASICS) and the second processing unit is an ASIC.

18. The image processing apparatus according to claim 1, wherein the printing elements are ink ejection ports configured to apply ink to the print medium.

19. An image processing apparatus that processes data made use of for printing an image by relatively moving a printing unit and a printing medium, wherein the printing unit includes a plurality of printing elements arranged in a first direction, and wherein the relative movement is in a second direction that intersects with the first direction, the image processing apparatus comprising:

a plurality of processors and at least one memory, wherein the plurality of processors, in accordance with an instruction stored in the at least one memory, is configured to function as units comprising:

(1) an acquisition unit configured to acquire image data corresponding to an image of one page;

(2) a first processing unit configured to process first image data corresponding to a first processing area of the image by using a common parameter for each pixel arranged in the second direction, for generating first print data that is used for the printing unit;

(3) a second processing unit configured to process second image data corresponding to a second processing area of the image by using a common parameter for each pixel arranged in the second direction, for generating second print data that is used for the printing unit, wherein a position of the second processing area is different from a position of the first processing area in the first direction within one page, and wherein a printing element to be used for printing the first processing area is different from a printing element to be used for printing the second processing area; and (4) a transmission unit configured to transmit the first image data to the first processing unit and to transmit the second image data to the second processing unit in a unit of band data corresponding to one band area, wherein the first processing area comprises a plurality of band areas, a length of each of the band areas of the first processing area is shorter than a length of the first processing area in the first direction, the second processing area comprises a plurality of band areas, and a length of each of the band areas of the second processing area is shorter than a length of the second processing area in the first direction, wherein, in a first mode, (a) the transmission unit transmits a plurality of units of band data to the first processing unit, and (b) during a period extending from a start of the transmission of the plurality of units of band data to the first processing unit to an end of the transmission of the plurality of units of band data to the first processing unit, the transmission unit transmits at least one unit of band data to the second processing unit, and wherein, in a second mode, the transmission unit sequentially transmits at least one unit of band data to the second processing unit after transmitting all of band data corresponding to the first processing area to the first processing unit.

20. A printing apparatus comprising:

a printing unit including a plurality of printing elements arranged in a first direction; and a conveyance unit configured to convey a printing medium in a second direction that intersects with the first direction, wherein the printing apparatus comprises a plurality of processors and at least one memory, and wherein the plurality of processors, in accordance with an instruction stored in the at least one memory, is configured to function as units comprising:

(1) an acquisition unit configured to acquire image data corresponding to an image of one page;

(2) a first processing unit configured to process first image data corresponding to a first processing area of the image by using a common parameter for each pixel arranged in the second direction, for generating first print data that is used for the printing unit;

(3) a second processing unit configured to process second image data corresponding to a second processing area of the image by using a common parameter for each pixel arranged in the second direction, for generating second print data that is used for the printing unit, wherein a position of the second processing area is different from a position of the first processing area in the first direction within one page, and wherein a printing element to be used for printing the first processing area is different from a printing element to be used for printing the second processing area; and (4) a transmission unit configured to transmit the first image data to the first processing unit and to transmit the second image data to the second processing unit in a unit of band data corresponding to one band area, wherein the first processing area comprises a plurality of band areas, a length of each of the band areas of the first processing area is shorter than a length of the first processing area in the first direction, the second processing area comprises a plurality of band areas, and a length of each of the band areas of the second processing area is shorter than a length of the second processing area in the first direction, wherein (a) the transmission unit transmits a plurality of units of band data to the first processing unit, and (b) during a period extending from a start of the transmission of the plurality of units of band data to the first processing unit to an end of the transmission of the plurality of units of band data to the first processing unit, the transmission unit transmits at least one unit of band data to the second processing unit.

21. The printing apparatus according to claim 20, wherein the first processing unit and the second processing unit process the pixels arranged in the second direction in order according to arrangement of the pixels in the second direction.

22. A control method of controlling an image processing apparatus that processes data made use of for printing an image by relatively moving a printing unit and a printing medium, wherein the printing unit includes a plurality of printing elements arranged in a first direction, and wherein the relative movement is in a second direction that intersects with the first direction, wherein the image processing apparatus comprises a plurality of processors and at least one memory, and wherein the plurality of processors, in accordance with an instruction stored in the at least one memory, is configured to function as units comprising:

(1) a first processing unit configured to process first image data corresponding to a first processing area of the image by using a common parameter for each pixel arranged in the second direction, for generating first print data that is used for the printing unit; and (2) a second processing unit configured to process second image data corresponding to a second processing area of the image by using a common parameter for each pixel arranged in the second direction, for generating second print data that is used for the printing unit, wherein a position of the second processing area is different from a position of the first processing area in the first direction within one page, and wherein a printing element to be used for printing the first processing area is different from a printing element to be used for printing the second processing area, wherein the plurality of processors is configured to perform:

(1) an acquiring step of acquiring image data corresponding to an image of one page; and (2) a transmitting step of transmitting the first image data to the first processing unit and transmitting the second image data to the second processing unit in a unit of band data corresponding to one band area, wherein the first processing area comprises a plurality of band areas, a length of the band areas of the first processing area is shorter than a length of the first processing area in the first direction, the second processing area comprises a plurality of band areas, and a length of the band areas of the second processing area is shorter than a length of the second processing area in the first direction, and wherein, in the transmitting step, (a) a plurality of units of band data is transmitted to the first processing unit, and (b) during a period extending from a start of the transmission of the plurality of units of band data to the first processing unit to an end of the transmission of the plurality of units of band data to the first processing unit, at least one unit of band data is transmitted to the second processing unit.

23. The control method according to claim 22, wherein the acquiring step comprises (a) a step of generating the image data corresponding to the image of one page based on a print job and (b) a step of temporarily storing at least a portion of the generated image data.

24. The control method according to claim 23, wherein the entire image data corresponding to the image of one page is stored in the step of temporarily storing.

25. The control method according to claim 22, wherein transmission of a unit of band data to the first image processing unit and transmission of a unit of band data to the second image processing unit are alternately repeated in the transmitting step.

26. A control method of controlling an image processing apparatus that processes data made use of for printing an image by relatively moving a printing unit and a printing medium, wherein the printing unit includes a plurality of printing elements arranged in a first direction, and wherein the relative movement is in a second direction that intersects with the first direction, wherein the image processing apparatus comprises a plurality of processors and at least one memory, and wherein the plurality of processors, in accordance with an instruction stored in the at least one memory, is configured to function as units comprising:

(1) a first processing unit configured to process first image data corresponding to a first processing area of the image by using a common parameter for each pixel arranged in the second direction, for generating first print data that is used for the printing unit; and (2) a second processing unit configured to process second image data corresponding to a second processing area of the image by using a common parameter for each pixel arranged in the second direction, for generating second print data that is used for the printing unit, wherein a position of the second processing area is different from a position of the first processing area in the first direction within one page, and wherein a printing element to be used for printing the first processing area is different from a printing element to be used for printing the second processing area, wherein the plurality of processors is configured to perform:

(1) an acquiring step of acquiring image data corresponding to an image of one page; and (2) a transmitting step of transmitting the first image data to the first processing unit and transmitting the second image data to the second processing unit in a unit of band data corresponding to one band area, wherein the first processing area comprises a plurality of band areas, a length of the band areas of the first processing area is shorter than a length of the first processing area in the first direction, the second processing area comprises a plurality of band areas, and a length of the band areas of the second processing area is shorter than a length of the second processing area in the first direction, and wherein, in a first mode, in the transmitting step, (a) a plurality of units of band data is transmitted to the first processing unit, and (b) during a period extending from a start of the transmission of the plurality of units of band data to the first processing unit to an end of the transmission of the plurality of units of band data to the first processing unit, at least one unit of band data is transmitted to the second processing unit, and wherein, in a second mode, in the transmitting step, at least one unit of band data is sequentially transmitted to the second processing unit after all of band data corresponding to the first processing area is transmitted to the first processing unit.

27. A non-transitory computer readable storage medium storing a program for causing a computer to perform a control method of controlling an image processing apparatus that processes data made use of for printing an image by relatively moving a printing unit and a printing medium, wherein the printing unit includes a plurality of printing elements arranged in a first direction, and wherein the relative movement is in a second direction that intersects with the first direction, wherein the image processing apparatus comprises a plurality of processors and at least one memory, and wherein the plurality of processors, in accordance with an instruction stored in the at least one memory, is configured to function as units comprising:

(1) a first processing unit configured to process first image data corresponding to a first processing area of the image by using a common parameter for each pixel arranged in the second direction, for generating first print data that is used for the printing unit; and (2) a second processing unit configured to process second image data corresponding to a second processing area of the image by using a common parameter for each pixel arranged in the second direction, for generating second print data that is used for the printing unit, wherein a position of the second processing area is different from a position of the first processing area in the first direction within one page, and wherein a printing element to be used for printing the first processing area is different from a printing element to be used for printing the second processing area, wherein the plurality of processors is configured to perform:

(1) an acquiring step of acquiring image data corresponding to an image of one page; and (2) a transmitting step of transmitting the first image data to the first processing unit and transmitting the second image data to the second processing unit in a unit of band data corresponding to one band area, wherein the first processing area comprises a plurality of band areas, a length of the band areas of the first processing area is shorter than a length of the first processing area in the first direction, the second processing area comprises a plurality of band areas, and a length of the band areas of the second processing area is shorter than a length of the second processing area in the first direction, and wherein, in the transmitting step, (a) a plurality of units of band data is transmitted to the first processing unit, and (b) during a period extending from a start of the transmission of the plurality of units of band data to the first processing unit to an end of the transmission of the plurality of units of band data to the first processing unit, at least one unit of band data is transmitted to the second processing unit.

* * * * *